US009129293B2

(12) United States Patent
Perez et al.

(10) Patent No.: US 9,129,293 B2
(45) Date of Patent: Sep. 8, 2015

(54) METHODS AND APPARATUS TO MEASURE MARKET STATISTICS

(75) Inventors: Albert Perez, San Francisco, CA (US); Shi Lu, San Ramon, CA (US); Michael F. Younge, San Francisco, CA (US)

(73) Assignee: The Nielsen Company (US), LLC, New York, NY (US)

( * ) Notice: Subject to any disclaimer, the term of this patent is extended or adjusted under 35 U.S.C. 154(b) by 1010 days.

(21) Appl. No.: 12/695,793

(22) Filed: Jan. 28, 2010

(65) Prior Publication Data
US 2010/0191723 A1    Jul. 29, 2010

Related U.S. Application Data

(60) Provisional application No. 61/148,251, filed on Jan. 29, 2009.

(51) Int. Cl.
*G06Q 10/00* (2012.01)
*G06Q 30/02* (2012.01)
*G06F 15/173* (2006.01)

(52) U.S. Cl.
CPC .............. *G06Q 30/02* (2013.01); *G06F 15/173* (2013.01); *G06Q 10/00* (2013.01)

(58) Field of Classification Search
CPC ... G06Q 30/02; G06Q 30/0203; G06F 15/173
USPC ........................... 705/7.29, 7.3; 709/223, 224
See application file for complete search history.

(56) References Cited

U.S. PATENT DOCUMENTS

| 5,845,285 | A | * | 12/1998 | Klein ..................................... 1/1 |
| 5,862,325 | A | * | 1/1999 | Reed et al. .................... 709/201 |
| 6,151,631 | A | | 11/2000 | Ansell et al. |
| 6,516,189 | B1 | | 2/2003 | Frangione et al. |

(Continued)

FOREIGN PATENT DOCUMENTS

GB        2408114        5/2005

OTHER PUBLICATIONS

Carlos, Sean,"Web Statistics for Internet Market Research: Pick a Number, any Number," Posted Jul. 2, 2007, http://antezeta.com/news/web-statistics-suppliers.*

(Continued)

*Primary Examiner* — Beth V Boswell
*Assistant Examiner* — Renae Feacher
(74) *Attorney, Agent, or Firm* — Hanley, Flight & Zimmerman, LLC

(57) ABSTRACT

Example methods and apparatus to measure market statistics are disclosed. A disclosed example method includes retrieving a service penetration value from a managed data source, retrieving an Internet protocol (IP) address from a convenience data source, and identifying a household identification number associated with the retrieved IP address. The example method also includes retrieving household data associated with the household identification number, verifying a service provider name provided by the convenience data source, and adjusting a weight value of the retrieved household data when the service provider name provided by the convenience data source is different than a current service provider name. Additionally, the example method includes calculating service provider flow share based on the adjusted weight value and the service penetration value, and generating a report including the calculated service provider flow share.

18 Claims, 14 Drawing Sheets

(56) References Cited

U.S. PATENT DOCUMENTS

| | | | |
|---|---|---|---|
| 6,684,250 B2 | 1/2004 | Anderson et al. | |
| 6,751,295 B2 | 6/2004 | McCulley et al. | |
| 7,200,658 B2 | 4/2007 | Goeller et al. | |
| 7,577,725 B1 | 8/2009 | Sitaraman et al. | |
| 7,818,201 B2 | 10/2010 | Shevlin et al. | |
| 8,280,996 B2 | 10/2012 | Lu et al. | |
| 2002/0052950 A1 | 5/2002 | Pillai et al. | |
| 2002/0143918 A1 | 10/2002 | Soles et al. | |
| 2002/0184533 A1 | 12/2002 | Fox | |
| 2003/0064722 A1 | 4/2003 | Frangione et al. | |
| 2003/0083924 A1 | 5/2003 | Lee et al. | |
| 2003/0093438 A1* | 5/2003 | Miller | 707/104.1 |
| 2003/0229534 A1 | 12/2003 | Frangione et al. | |
| 2004/0019518 A1 | 1/2004 | Abraham et al. | |
| 2004/0030605 A1* | 2/2004 | Ling | 705/26 |
| 2004/0068582 A1 | 4/2004 | Anderson et al. | |
| 2004/0122939 A1* | 6/2004 | Perkins | 709/224 |
| 2004/0177276 A1 | 9/2004 | MacKinnon et al. | |
| 2004/0193918 A1 | 9/2004 | Green et al. | |
| 2004/0250119 A1* | 12/2004 | Shelest et al. | 713/201 |
| 2005/0096969 A1 | 5/2005 | Sevio | |
| 2005/0108378 A1* | 5/2005 | Patterson et al. | 709/223 |
| 2006/0031385 A1 | 2/2006 | Westerdal | |
| 2006/0106944 A1* | 5/2006 | Shahine et al. | 709/245 |
| 2006/0129503 A1* | 6/2006 | Roberts et al. | 705/75 |
| 2006/0130147 A1 | 6/2006 | Von-Maszewski | |
| 2006/0178903 A1* | 8/2006 | Cruz-Rivera | 705/1 |
| 2006/0184381 A1 | 8/2006 | Rice et al. | |
| 2006/0212931 A1* | 9/2006 | Shull et al. | 726/10 |
| 2008/0040777 A1* | 2/2008 | Aihara et al. | 726/4 |
| 2008/0046569 A1* | 2/2008 | DePue et al. | 709/227 |
| 2008/0065440 A1 | 3/2008 | Graham et al. | |
| 2008/0189408 A1* | 8/2008 | Cancel et al. | 709/224 |
| 2008/0256235 A1* | 10/2008 | Or Sim et al. | 709/224 |
| 2008/0281696 A1* | 11/2008 | Whitehead | 705/14 |
| 2008/0281699 A1 | 11/2008 | Whitehead | |
| 2008/0313019 A1* | 12/2008 | Jeffers | 705/10 |
| 2008/0320119 A1* | 12/2008 | Achan et al. | 709/222 |
| 2009/0070289 A1* | 3/2009 | Churi et al. | 707/2 |
| 2009/0112918 A1* | 4/2009 | Terrell | 707/102 |
| 2009/0132395 A1* | 5/2009 | Lam et al. | 705/30 |
| 2009/0150166 A1* | 6/2009 | Leite et al. | 705/1 |
| 2009/0197582 A1* | 8/2009 | Lewis et al. | 455/414.2 |
| 2010/0191577 A1* | 7/2010 | Lu et al. | 705/10 |
| 2010/0191723 A1 | 7/2010 | Perez et al. | |

OTHER PUBLICATIONS

Keefe, Jeff, "Monopoly.com Will the WorldCom-MCI Merger Tangle the Web?", Economic Policy Institute, 1998.*

Ruitenberg, Rudy, Custom Internet Domain Suffixes Approved, washingtonpost.com, dated Jun. 27, 2008, 2 pages.

CrucialParadigm, How Reverse DNS works (RDNS), www.crucialp. com, retrieved from the Internet on Jan. 6, 2009, 2 pages.

AuditMyPC, Port Scanning, www.auditmypc.com, retrieved from the Internet on Jan. 5, 2009, 5 pages.

National Center for Health Statistics, NCHS Guidelines for Ensuring the Quality of Information Disseminated to the Public, www.cdc. gov/nchs/about/quality.htm, retrieved from the Internet on Jan. 27, 2009, 7 pages.

International Searching Authority, International Search Report issued for PCT/US10/22384, mailed Jul. 23, 2010, 3 pages.

International Searching Authority, Written Opinion issued for PCT/US10/22384, mailed Jul. 23, 2010, 7 pages.

International Searching Authority, Written Opinion issued for PCT/US2010/022387, mailed on Jun. 29, 2010, 7 pages.

International Searching Authority, International Search Report issued for PCT/US2010/022387, mailed on Jun. 29, 2010, 3 pages.

International Bureau, International Preliminary Report on Patentability issued in PCT/US2010/022384, issued on Aug. 2, 2011, 9 pages.

International Bureau, International Preliminary Report on Patentability issued in PCT/US2010/022387, issued on Aug. 2, 2011, 9 pages.

United States Patent and Trademark Office, "Notice of Allowance," issued in connection with U.S. Appl. No. 12/576,805, mailed Jun. 4, 2012, 22 pages.

Australian Patent Office, "Patent Examination Report No. 1," issued in connection with Australian application serial No. 2010208227, issued Feb. 28, 2013, 3 pages.

United States Patent and Trademark Office, "Non-Final Office Action," issued in connection with U.S. Appl. No. 13/616,693, issued Mar. 18, 2013, 27 pages.

Japanese Patent Office, "Office Action," with English translation, issued in connection with Japanese application serial No. P2011-548290, issued Jan. 29, 2013, 6 pages.

IP Australia, "Patent Examination Report No. 1," issued in connection with corresponding Australian Patent Application No. 2013203834, mailed Oct. 2, 2014 (3 pages).

European Patent Office, "Extended European Search Report," issued in connection with European Patent Application No. 10702966.2 on Feb. 28, 2014 (7 pages).

European Patent Office, "Supplementary European Search Report," issued in connection with European Patent Application No. 10702966.2 on Mar. 18, 2014 (1 page).

Intellectual Property Office of Great Britain, "Examination Report," issued in connection with Great Britain Patent Application No. GB1113767.6 on Jun. 13, 2013 (4 pages).

United States Patent and Trademark Office, "Final Office Action," issued in connection with U.S. Appl. No. 13/616,693 on Nov. 5, 2013 (11 pages).

European Patent Office, "Extended European Search Report," issued in connection with European Patent Application No. 10702967.0 on Sep. 9, 2013 (8 pages).

European Patent Office, "Supplementary European Search Report," issued in connection with European Patent Application No. 10702967.0 on Sep. 26, 2013 (1 page).

Intellectual Property Office of Great Britain, "Examination Report," issued in connection with Great Britain Patent Application No. GB1113769.2 on Mar. 24, 2014 (5 pages).

IP Australia, "Examination Report," issued in connection with Australian Application No. 2010208224, mailed Aug. 31, 2012 (2 pages).

Japan Patent Office, "Office Action," issued in connection with Japanese Patent Application No. P2011-548288, mailed Jan. 29, 2013 (7 pages).

United States Patent and Trademark Office, "Non-Final Office Action," issued in connection with U.S. Appl. No. 12/576,805, mailed Jun. 29, 2011 (13 pages).

IP Australia, "Notice of Acceptance," issued in connection with Australian Application No. 2010208227, mailed Jun. 2, 2014 (1 page).

* cited by examiner

METHODS AND APPARATUS TO MEASURE MARKET STATISTICS

RELATED APPLICATION

This patent claims the benefit of U.S. Provisional application Ser. No. 61/148,251, filed on Jan. 29, 2009, which is hereby incorporated by reference herein in its entirety.

FIELD OF THE DISCLOSURE

This disclosure relates generally to market research and, more particularly, to methods and apparatus to measure market statistics.

BACKGROUND

Service providers, such as media service providers and/or Internet service providers (ISPs) that choose to participate in a market typically need to acquire information about their competitors. Competitive information allows the provider to employ strategic and/or tactical decisions related to opportunities that may increase a subscriber base and/or identify which market areas may be particularly receptive to the services provided by the provider. Additionally, information about the provider and its competitors permits a comparison to reveal market presence and/or market dominance.

Obtaining information related to the presence of competitive providers and/or the market share in any particular geographic market may entail conducting surveys. Surveys, whether oral or written, typically yield low sample rates when compared to the total number of existing subscribers. Additionally, answers to the surveys are usually provided by a human respondent, who is prone to inaccuracy regarding details of their existing provider. For example, a human respondent may state the name of their browser application or computer manufacturer instead of the name of their provider.

Additionally, because oral and written surveys are perceived as a burden to subscribers, providers are not likely to enjoy opportunities to determine whether the subscriber's status has changed. For example, a subscriber to a provider is not typically bound by contracts that restrict and/or discourage competitive shopping with alternate providers. Thus, if the subscriber agrees to answer survey questions at a first time, such subscriber is not likely to also agree to another survey question at a second time (e.g., two-months after the first survey). Instead, the subscriber is likely to view the additional survey questions as a burden not worthy of their time.

DETAILED DESCRIPTION

Figure 1:
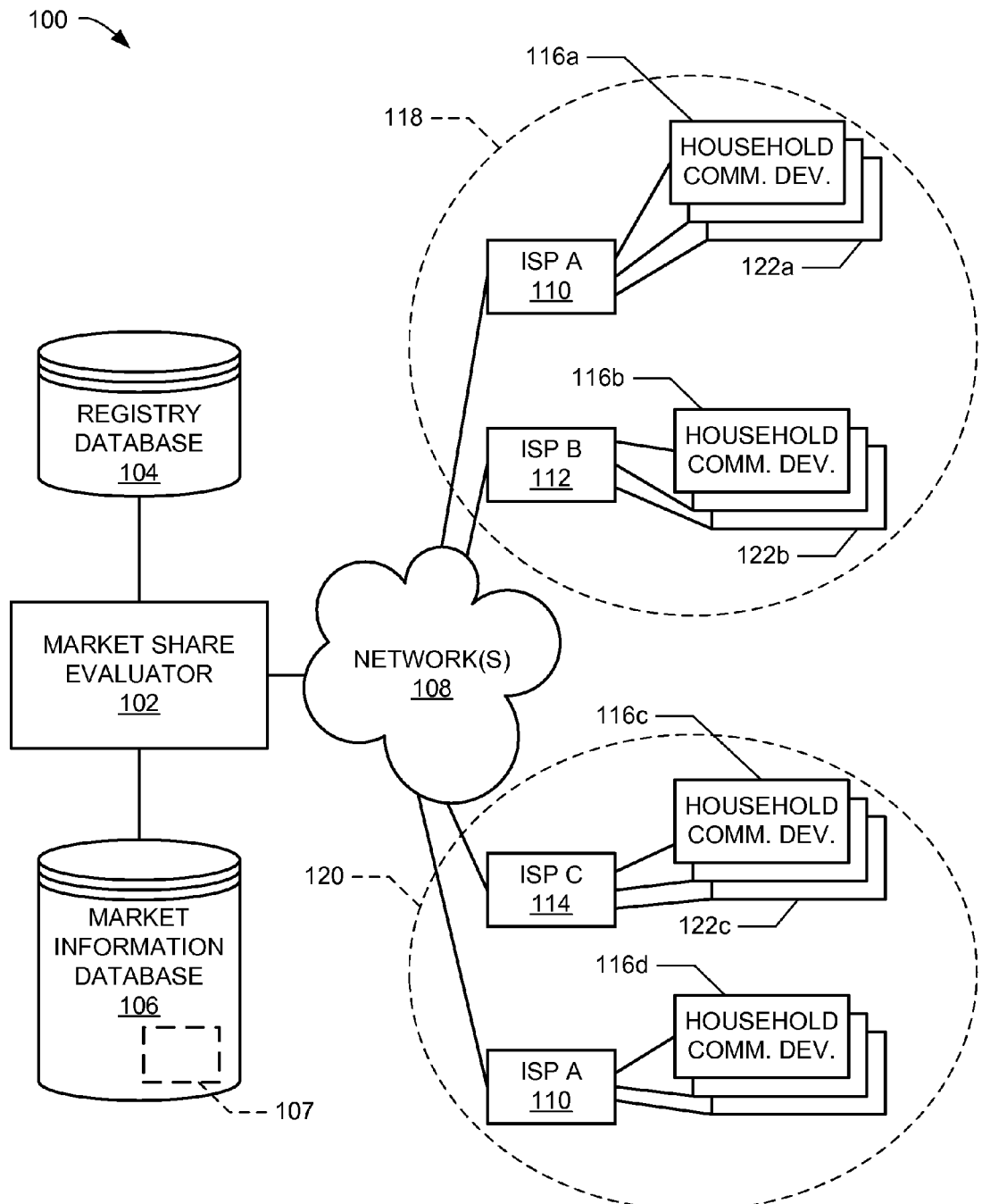
FIG. 1 is a block diagram of an example system to measure market statistics.

Although the following discloses example methods and apparatus including, among other components, software executed on hardware, such methods and apparatus are merely illustrative and should not be considered as limiting. For example, any or all of these hardware and software components could be embodied exclusively in hardware, exclusively in software, or in any combination of hardware and software. Accordingly, while the following describes example methods, systems, and apparatus, the examples provided are not the only way to implement such methods, systems, and apparatus.

Example methods and apparatus to measure market statistics are disclosed. A disclosed example method includes retrieving a service penetration value from a managed data source, retrieving an Internet protocol (IP) address from a convenience data source, and identifying a household identification number associated with the retrieved IP address. The example method also includes retrieving household data associated with the household identification number, verifying a service provider name provided by the convenience data source, and adjusting a weight value of the retrieved household data when the service provider name provided by the convenience data source is different than a current service provider name. Additionally, the example method includes calculating service provider flow share based on the adjusted weight value and the service penetration value, and generating a report including the calculated service provider flow share.

A disclosed example apparatus includes a registry manager to retrieve a service penetration value from a managed data source, a data source locator to identify a convenience data source associated with a household identification number and obtain an Internet protocol (IP) address associated with the household identification number, and a network interface to retrieve data from the convenience data source associated with the household identification number. The example apparatus also includes a data source combiner to generate a verified service provider name based on a service provider name retrieved from the convenience data source and associated with the IP address, a data source weight calculator to adjust a weight value of the retrieved data from the convenience data source when the service provider name retrieved from the convenience data source is different than the verified service provider name, and a test manager to calculate service provider flow share based on the adjusted weight value from the convenience data source and a calculated market share based on the service penetration value.

While examples below describe Internet service providers (ISPs), such examples are provided for convenience and not to be construed as limited to ISPs and the methods and apparatus described herein may be applied to any other type of provider. In the event that a provider of services, such as a media provider (e.g., a cable television provider, a satellite provider) and/or an ISP gains or loses subscribers, the provider is particularly interested in learning whether competitors experience a similar gain or loss. For example, if the ISP and one or more competitors experience similar gains in subscribers, then the general market area may be experiencing growth. Such an indication may prompt the ISP to increase advertising and/or promotional resources to attempt to capture such growth (e.g., market share) opportunities before one or more competitors capture a greater portion of the available subscribers. Alternatively, if the ISP and one or more competitors experience subscriber losses, then the general market area may be stagnant and/or shrinking, which may indicate advertising and/or promotional efforts should focus on one or more alternate markets. On the other hand, in the event that the ISP market share is higher than one or more competitors and/or rate of new subscribers is increasing as compared to one or more competitors, then the ISP may gain insight to the effectiveness of an advertising campaign and/or a promotion.

The methods and apparatus described herein identify, in part, candidate internet protocol (IP) addresses that may be associated with subscribers, whether the IP addresses are active or inactive, the ISP associated with each IP address, and/or the location of the IP address. As described in further detail below, the methods and apparatus described herein allow a user to collect broadband market data for one or more market(s) of interest and/or from one or more data sources of interest. As such, the user is better able to calculate market share for one or more broadband ISPs because, in part, market statistic calculation confidence increases when a statistically significant amount of representative data is available. An example market share database is updated on a scheduled basis, a manual basis, periodically, or aperiodically to store known ISPs, name servers, and/or router nomenclature (e.g., ge-0-1-ubr01.warren.ma.boston.comcast.net) associated with ISPs and/or IP addresses. In particular, the example methods and apparatus described herein identify one or more key words, letters, numbers, labels, and/or combinations thereof that may be indicative of geography (e.g., "ma," "boston," etc.) and/or one or more markets of interest.

FIG. 1 is an illustration of an example system 100 to measure broadband market statistics. In the illustrated example of FIG. 1, the system includes a market share evaluator 102 communicatively connected to a registry database 104 and a market information database 106. The example registry database 104 may include one or more databases that identify which registrant is associated with one or more registered IP addresses and/or domain names. Such registry databases 104 include, but are not limited to, information from the American Registry for Internet Numbers (ARIN), the Internet Corporation for Assigned Names and Number (ICANN), IP Geolocation by Maxmind®, etc. Additionally, the example market information database 106 includes resolution keywords in an example resolution keyword table 107 to, in part, allow resolution of one or more hostname labels that may be cryptic and/or otherwise unfamiliar to a user of the methods and apparatus described herein. For example, in response to an example Whois query to ARIN, one or more labels may be returned having no apparent relationship to a state, a city, and/or a known ISP name. Accordingly, the example resolution keywords 107 may be used to decipher such labels.

The example market share evaluator 102 is also communicatively connected to one or more networks 108, such as the Internet. Any number of ISPs, such as example ISP "A" 110, ISP "B" 112, and ISP "C" are communicatively connected to the network 108, in which each ISP provides one or more services to household communication devices 116a-d. Household communication devices 116a-d may include, but are not limited to routers, modems and/or other equipment communicatively connected to an ISP. Each example ISP may be responsible for providing services (e.g., such as household Internet access, telephony, and/or media services) in an identified geographic market area. In the illustrated example of FIG. 1, ISP "A" 110 provides services to one or more household communication devices 116a, and ISP "B" 112 provides services to one or more household communication devices 116b, both of which are located in an example first market area 118. On the other hand, example ISP "C" 114 provides services to one or more household communication devices 116c in an example second market area 120.

In the illustrated example of FIG. 1, ISP "A" 110 provides services to one or more household communication devices in both the first market area 118 and the second market area 120. As described in further detail below, each household communication device is assigned an IP address (e.g., a static IP address or a dynamic IP address) by the ISP that is registered for use and/or management by that ISP. In the event that the ISP of interest has a presence in more than one market area (e.g., only the first market area 118, only the second market area 120, etc.), then the methods and apparatus described herein perform one or more techniques to ascertain the most likely geographic indicator (e.g., a state, a city, etc.) for the IP address assigned to the household communication device(s). For example, if one of the example household communication devices 116a has an IP address of 208.180.36.166, and one of the example household communication devices 116d has an IP address of 208.180.250.75, both of which are registered by ISP "A" 110, then the methods and apparatus described herein associate each IP address with a corresponding ISP router that provides geographic location cues. In particular, the methods and apparatus described herein may identify that the last router hop in the communicative path to IP address to 208.180.36.166 is associated with hostname s208-180-36-166.snjs.ca.sta.suddenlink.net," which includes one or more geographic location cues (e.g., "snjs" refers to San Jose).

Without limitation, the methods and apparatus described herein test one or more IP addresses to determine whether the IP address of interest is active or inactive. Generally speaking, an ISP registers one or more blocks of IP addresses that may be assigned to subscribers. ARIN is one of five Regional Internet Registries (RIRs) that manage IP address resources. Other RIRs include the Asia Pacific Network Information Centre (APNIC) and the Latin American and Caribbean IP Address Regional Registry (LACNIC). ARIN facilitates one or more processes that allow a user (e.g., an ISP) to register (usually for a fee) one or more IP addresses for exclusive use and to associate the registered IP address with a hostname. ARIN also facilitates a database lookup facility to allow queries (e.g., Whois queries) of an IP address to return a corresponding hostname, organization information, and/or whether the organization has other registered IP addresses (e.g., a block of IP addresses). However, while the organization information may include a corresponding contact name and/or address, such organization information may not be indicative of where the registered IP address(es) are being used (located). To illustrate, the IP address 68.87.148.146 is associated with, at the time of this writing, Comcast Cable Communications, Inc. having an organization address in Mt. Laurel, N.J. The ARIN database also indicates that this organization has registered a block of IP addresses ranging from 68.80.0.0 to 68.87.255.255. However, a User Datagram Protocol (UDP) and/or an Internet Control Message Protocol (ICMP) trace-route of the IP address 68.87.148.146 reveals that the last router hostname is "ge-0-1-ubr01.warren.ma.boston.comcast.net." As described above, the labels within the example hostname provide at least two geographic cues (i.e., "ma," and "boston") of where the IP address of interest is likely being used. In this example, the most likely geographic location associated with the IP address 68.87.148.146 is Boston, Mass.

While the concept of a hostname is to, in part, facilitate a human-readable association with a specific IP address, the hostname and/or one or more labels of the hostname concatenated with dots may still appear cryptic to a human attempting to read it. For example, labels within the example hostname "snjs.ca.sta.suddenlink.net" may not readily appear to reveal useful information to persons unfamiliar with the San Jose area. Alternatively, users may confuse the label "ca" with nomenclature associated with Canada rather than California. To better resolve hostname labels and determine geographic and/or organizational association(s), the methods and apparatus described herein parse the hostname labels and search the example market information database 106 for matching (e.g., logical ANDed) combinations. In the event that a match of two or more labels is found after a logical AND, a candidate geographic location and/or associated organization associated with the IP address may be determined. To illustrate with the above-identified example hostname "snjs.ca.sta.suddenlink.net," the methods and apparatus described herein search for a combination of labels "snjs," "ca," and "suddenlink" before concluding that the router hostname is properly associated with the organization Suddenlink Communications, Inc. located in San Jose, Calif.

Returning to the illustrated example of FIG. 1, one or more household communication devices may be associated with one or more panelists, such as panelist router "A" 122a, panelist router "B" 122b, and panelist router "C" 122c. One or more panelist households may be selected by, for example, a marketing entity to obtain a statistically significant sample size of behavior so that projections to a larger universe may be made with an acceptable degree of confidence. Panelists are typically selected in sufficient numbers to achieve statistical significance, and represent one or more particular geographic and/or demographic aspects of a larger universe of participants (e.g., subscribers of Internet services, viewers of media devices, Hispanic consumers, Japanese consumers, etc.). One or more households typically become a panelist based on, in part, an agreement with the monitoring entity (e.g., the marketing entity) to have one or more household behaviors monitored. Household behaviors of interest to the monitoring entity include, but are not limited to, television programs watched, dates/times at which programs are watched, shopping behaviors, web sites visited, and/or household services purchased (e.g., Internet services, telephony services, etc.). The agreement with the household panelists also includes explicit information related to the household address, thereby revealing their location. In the illustrated example of FIG. 1, the panelists 122a-c also provide information related to the IP address assigned to their router(s) and the ISP with which the household subscribes.

As described in further detail below, the example market share evaluator 102 periodically, aperiodically, manually, or on a scheduled basis retrieves updates from the panelist households 122a-c to obtain the most recent IP address and ISP used by that household. For example, each panelist household may have one or more personal computers running one or more applications that determine the assigned router IP address and e-mail such IP address information back to the marketing entity. In the event that a household decides to change which ISP supplies Internet services, the example market share evaluator 102 updates the example market information database 106 with information related to the new and/or alternate ISP. In this manner, the system 100 may stay appraised of additional ISPs that enter the first market area 118 and/or the second market area 120. Additionally, the example market share evaluator 102 identifies one or more new and/or alternate hostname labels indicative of the new and/or alternate ISP. As a result, hostname resolution related to IP address location and its associated organization (e.g., its associated ISP) can be performed using the proper label(s).

Figure 2:
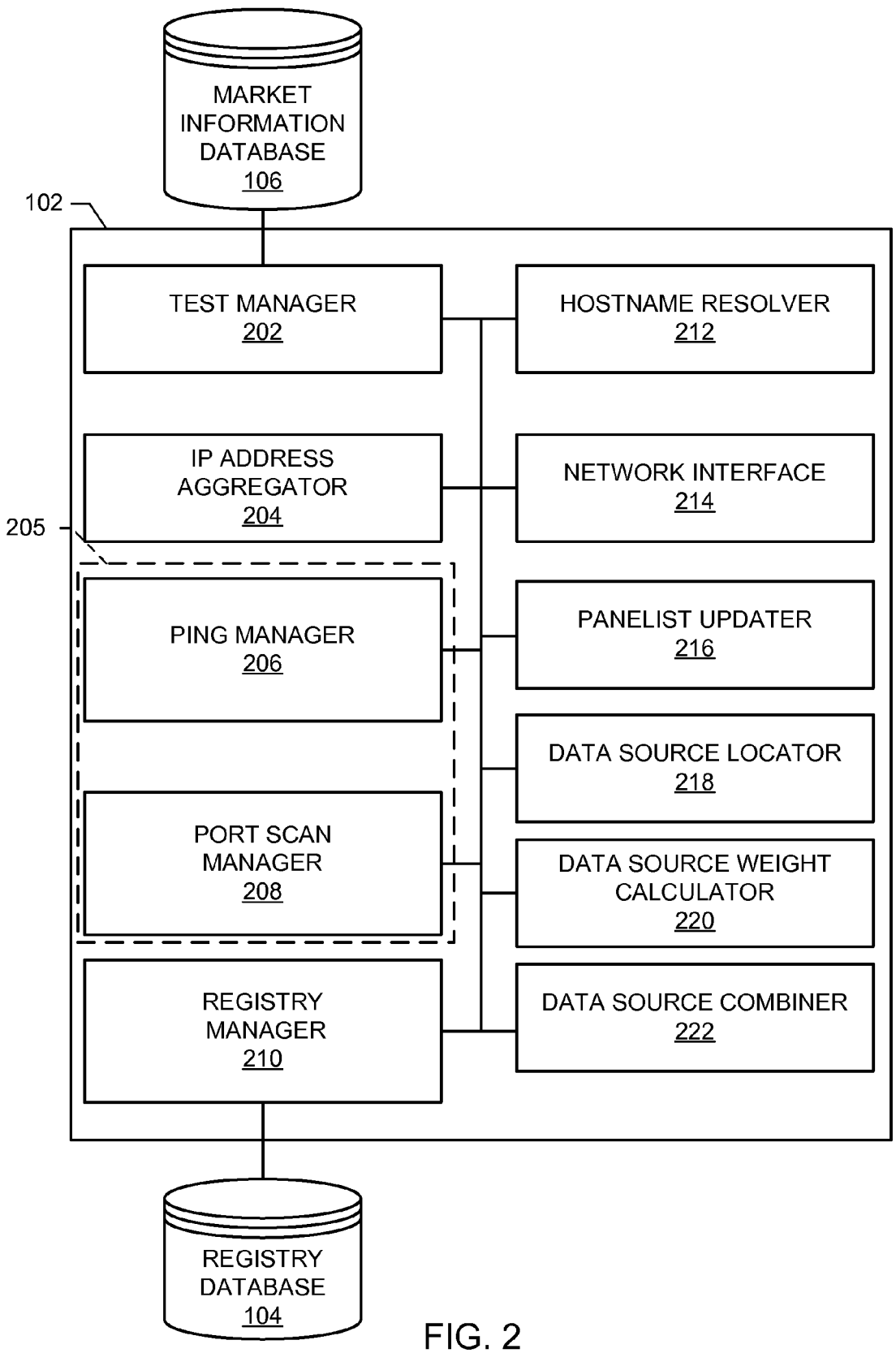
FIG. 2 is a block diagram of an example market share evaluator shown in FIG. 1.

FIG. 2 is a detailed schematic illustration of the example market share evaluator 102 shown in FIG. 1. The example market share evaluator 102 includes a test manager 202, an IP address aggregator 204, and an activity determiner 205 that includes an example ping manager 206, and a port scan manager 208. The example market share evaluator 102 also includes a registry manager 210 that is communicatively connected to the example registry database 104. Further, the example market share evaluator 102 includes a hostname resolver 212, a network interface 214 communicatively connected to the example network 108 (e.g., the Internet), a panelist updater 216, a data source locator 218, a data source weight calculator 220, and a data source combiner 222. The example test manager 202 is communicatively connected to the market information database 106 the IP address aggregator 204, the ping manager 206, the port scan manager 208, the registry manager 210, the hostname resolver 212, the network interface 214, the panelist updater 216, the data source locator 218, the data source weight calculator 220, and the data source combiner 222 to invoke one or more services thereof. The example test manager 202, on a periodic, scheduled, aperiodic, and/or manual basis invokes a test of one or more IP addresses to determine whether it is active or inactive. Additionally, the example test manager 202 determines a corresponding organization and location associated with the IP address. Once information related to an IP address active/inactive status, an organization, and a location is obtained, the example test manager 202 calculates market share statistics for each organization that provides Internet services to subscribers.

In operation, the example test manager 202 invokes the example IP address aggregator 204 to obtain one or more IP addresses of interest when performing a test. For example, the IP address aggregator 204 may provide one or more IP addresses of interest from the market information database 106, which may store IP addresses identified from one or more previous tests to determine an active/inactive state. As such, the data within the example market information database 106 may be kept current. Without limitation, the example IP address aggregator 204 selects one or more IP addresses of one or more panelist households 122a-c. Additionally, the IP address aggregator 204 may select one or more neighboring IP addresses that could be part of a block of IP addresses registered by the ISP associated with the panelist. The IP address aggregator 204 may also invoke the registry manager 210 to obtain one or more IP addresses associated with a specific organization/ISP. For example, the IP address aggregator 204 may specify an organization name "WOW MEDIA" to determine which IP addresses and/or blocks of IP addresses are registered by the organization/ISP of interest. In operation, the example registry manager 210 contacts at least one registry database, such as ARIN, and provides organizational name keywords as input to the registry database. In response to the query, the example registry manager 210 receives corresponding IP addresses, a seed starting IP address, and/or blocks of IP addresses associated with the keyword input(s). Rather than test all of the returned IP addresses identified from the registry database query, the example test manager 202 may randomly select a predetermined number of IP addresses from the block (e.g., a subset of the block) to test. As such, a representative random sample of IP addresses may provide a reasonable indication of market presence of the organization. Additionally or alternatively, the example test manager 202 may employ the seed starting IP address as a randomly selected IP address within the range associated with the organization. The randomly selected seed starting IP address may service as a starting IP address, an ending IP address, and/or a midpoint IP address within a range of IP addresses to test.

To determine whether an IP address of interest is active, the example ping manager 206 performs an ICMP Ping operation via the example network interface 214 using the IP address of interest. Generally speaking, a ping is a computer network tool employed to determine whether a host is reachable across a network and sends ICMP echo request packets to the target IP address of interest. After sending each echo request packet, the example ping manager 206 listens via the network interface 214 for ICMP echo response reply messages. If such reply messages are received, then the IP address of interest is deemed active. In some instances, an ISP and/or one or more routers in the path may block a ping request (e.g., for security concerns), at which point the example port scan manager 208 attempts to scan one or more ports (e.g., TCP port 80 http service, TCP port 443 https service, etc.) of the machine associated with IP address of interest. A successful port scan results in the IP address of interest being deemed active. Generally speaking, some ISPs may block either or both of a port scan or ping. If neither the ping nor the port scan are successful, the IP address of interest is deemed inactive and the market information database 106 is updated accordingly.

IP addresses of interest having a successful ping or port scan are further associated with information obtained from one or more registry databases 104, such as the ARIN database that stores registry information for IP addresses in North America, Canada, the Caribbean, and the North Atlantic Islands. A query to the ARIN database is also referred to as a Whois query, which accepts the IP address or hostname as input and returns information including, but not limited to, an associated organization, a contact person(s), contact telephone number(s), a contact address, and/or contact e-mail address. The organizational information returned from the ARIN query is compared to the market information database 106 for a match that indicates whether the organization is a corporation, a university, or an ISP. If the IP address of interest is associated with an ISP, then it is also deemed to be used for residential purposes.

The methods and apparatus described herein further determine a corresponding location and more detailed ownership information. In other words, while the ARIN query described above identifies the organization that registered the IP address of interest, such organization may be a reseller of IP addresses rather than the ultimate user. As such, the example hostname resolver 212 of FIG. 2 performs a reverse domain name server (DNS) lookup (sometimes referred to as NSLookup (name-server lookup)) on the IP address to identify one or more cues indicative of true ownership. For example, an ARIN database query on the IP address 64.236.16.20 identifies "AOL Transit Data Network" as the organization that has registered IP addresses ranging from 64.236.0.0 to 64.236.255.255. However, the ultimate party and/or end-user for the IP address 64.236.16.20 is more accurately determined based on a reverse DNS lookup (also referred to as a reverse resolve) performed by the example hostname resolver 212, which reveals a hostname of "www2.cnn.com." Accordingly, the example hostname resolver 212 parses the hostname, extracts "cnn" and confirms the true end-user as CNN if a label-match is found in the example market information database 106.

To determine a location associated with the IP address of interest, the example hostname resolver 212 performs a multi-location trace-route. Generally speaking, a trace-route is a computer network application to identify the routers traversed by packets in an IP network. The trace-route application identifies multiple hops of routers, starting with the router closest to the requestor and ending with the last router closest to the target IP address. Router identification during each hop includes, in part, a name for each router. Router hops may be influenced by, in part, one or more firewalls that cause alternate hop destinations. Typically, the last router listed is a series of router hops geographically closest to the device associated with the IP address of interest. Depending on the location of the requestor that is performing a trace-route test, one or more router hops may be different when compared to a requestor in a separate location. In both cases, the last router hop is usually the same, but in some instances the last router hop may identify a different router. Such alternate paths may occur in the example event where one or more router path(s) are down due to, for example, hardware failure(s), power failure(s), and/or localized weather interruptions.

To improve the confidence level that the last router hop is correct during the trace-route, the example hostname resolver 212 performs a multi-location trace-route, in which the originating trace-route test uses the same IP address of interest, but at separate originating locations. For example, a first trace-route for IP address 24.32.38.55 may originate in San Francisco, Calif., a second trace-route for the same IP address may originate in Dallas, Tex., and a third trace-route for the same IP address may originate in Lindbergh, Va. While all three of these originating locations will include one or more initial unique router hops, the ultimate path of test packets is expected to reach the same last hop router. If all trace-route tests identify the same last hop router information (e.g., s208-180-36-166.snjs.ca.sta.suddenlink.net), then the example hostname resolver 212 parses the labels of the hostname for cues indicative of location. Such cues (e.g., labels "snjs," "ca," and "suddenlink") are compared against those labels stored in the example market information database 106 to resolve, or otherwise translate cryptic abbreviations and/or codes that refer to an organization (e.g., an ISP), a city (e.g., "snjs"), a state (e.g., "ca," "ma," etc.), or any other geographic identifier. On the other hand, if not all of the separate originating locations ultimately yield the same last hop router, then the example hostname resolver 212 may employ a threshold test before parsing labels from the hostname for location cues. In other words, a lower degree of confidence that the last hop router is the actual IP address location occurs when fewer than all separate originating locations yield the same last hop router name.

After identifying whether the IP address of interest is active or inactive, and after identifying a corresponding IP address owner (e.g., a true end-user rather than just the organization named by the registry), and after identifying a corresponding location of the IP address of interest, the methods and apparatus described herein save such information to the example market information database 106 (e.g., as tabular information). Typically, one or more entities interested in measuring broadband market statistics prefer to obtain a sufficient amount of sample measurements before any calculated results will be deemed statistically significant. As such, the methods and apparatus described herein may test any number of IP addresses of interest before calculating a corresponding market share of active IP addresses for any given time period (e.g., calculated market share per day, per week, per bi-week, per month, etc.). For example, if the example market share evaluator 102 tests five-hundred IP addresses associated with a first ISP and five-hundred IP addresses associated with a second ISP, then the example test manager 202 calculates a corresponding percentage of active IP addresses for each of the first and second ISP. Such calculated percentages may occur, for example, on a weekly basis to determine a projected broadband market presence per geographic area and/or identify one or more trends of market share penetration for competing ISPs.

IP addresses previously identified as active and/or associated with an organization are saved to the example market information database 106 for subsequent testing at a later date/time. For example, subscribers to ISP services may leave the ISP for a competitor's ISP, thereby causing the previously active IP address to become inactive/dormant. Subsequent testing of that same IP address may reveal that the IP address remains dormant/inactive for a period of time, or is reallocated to another subscriber. Additionally, performing one or more subsequent tests on the previously identified IP address(es) may prevent and/or minimize the need for additional queries to the registry database(s), in which each query may be associated with an access fee.

The methods and apparatus described herein also combine two or more data sources to, in part, obtain a sufficient number of samples for making projections to one or more larger populations and/or to utilize one or more data sources that, standing alone, may not include a sample size large enough or representative enough to allow for statistically significant calculation(s). As described in further detail in connection with FIGS. 11-13, the example data source locator 218 identifies one or more data sources stored and/or otherwise identified by an example database information pool 1060 of FIG. 10. For example, as new managed and/or unmanaged (convenience) data sources are identified and/or learned by a user, such data sources may be stored in the example database information pool 1060 along with characteristics thereof. Data source characteristics may include, but are not limited to information related to the sample size of the data source, date(s) for which samples were obtained, geographies in which the samples were obtained, and/or a corresponding weighting factor of the data source(s). In the event that one or more data sources identified in the database information pool 1060 do not include a corresponding weighted value, which is typically indicative of a geographic sample scope, the example data source weight calculator 220 performs one or more weight calculations to generate a weighted value based on the corresponding geographic scope of the identified data source. Additionally, the example data source combiner 222 combines one or more data sources to increase a representative sample size, which allows for one or more projections and/or market statistic calculations for larger populated areas of interest.

While an example system 100 to measure broadband market statistics and an example market share evaluator 102 has been illustrated in FIGS. 1 and 2, one or more of the interfaces, data structures, elements, processes and/or devices illustrated in FIGS. 1 and 2 may be combined, divided, re-arranged, omitted, eliminated and/or implemented in any other way. Further, the example market share evaluator 102, the example test manager 202, the example IP address aggregator 204, the example ping manager 206, the example port scan manager 208, the example registry manager 210, the example hostname resolver 212, the example network interface 214, the example panelist updater 216, the example data source locator 218, the data source weight calculator 220, and/or the data source combiner 222 of FIGS. 1, 2, and 10 may be implemented by hardware, software, and/or firmware. Thus, for example, any of the example market share evaluator 102, the example test manager 202, the example IP address aggregator 204, the example ping manager 206, the example port scan manager 208, the example registry manager 210, the example hostname resolver 212, the example network interface 214, the example panelist updater 216, the example data source locator 218, the data source weight calculator 220, and/or the data source combiner 222 may be implemented by one or more circuit(s) (ASIC(s)), programmable logic device(s) (PLD(s)), and/or field programmable logic device(s) (FPLD(s)), etc. When any of the appended claims are read to cover a purely software and/or firmware implementation, at least one of the example market share evaluator 102, the example test manager 202, the example IP address aggregator 204, the example ping manager 206, the example port scan manager 208, the example registry manager 210, the example hostname resolver 212, the example network interface 214, the example panelist updater 216, the example data source locator 218, the data source weight calculator 220, and/or the data source combiner 222 are hereby expressly defined to include a tangible medium, such as a memory, a digital versatile disc (DVD), a compact disc (CD), etc. storing the firmware and/or software. Further still, a communication system may include interfaces, data structures, elements, processes, and/or devices instead of, or in addition to, those illustrated in FIGS. 1, 2, and 10 and/or may include more than one of any or all of the illustrated interfaces, data structures, elements, processes and/or devices.

Figure 10:
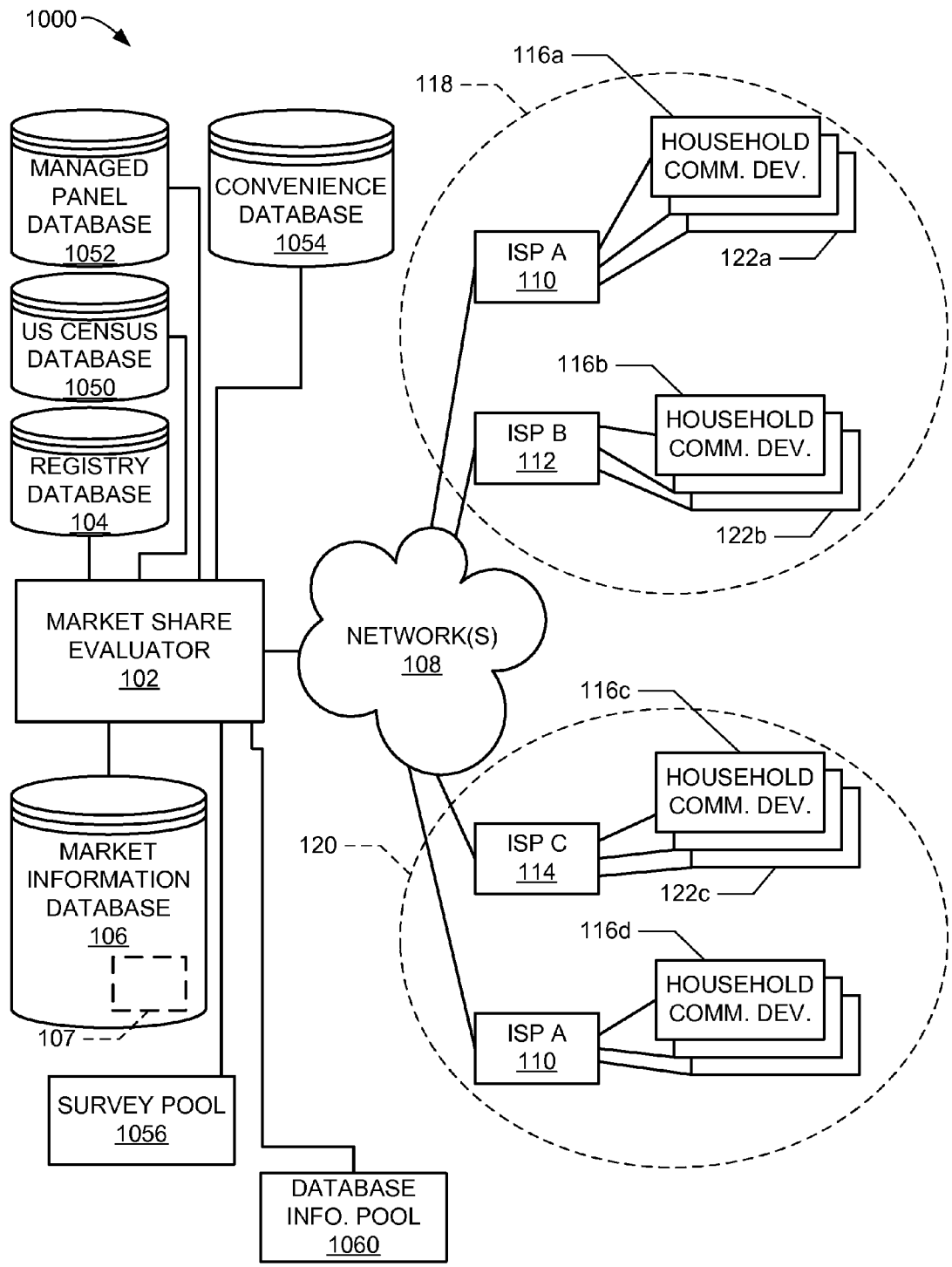
FIG. 10 is a block diagram of another example system to measure market statistics.

FIGS. 3-8 and 11-13 illustrate example processes that may be performed to implement the example market share evaluator 102 of FIGS. 1, 2, and 10. The example processes of FIGS. 3-8 and 11-13 may be carried out by a processor, a controller, and/or any other suitable processing device. For instance, the example processes of FIGS. 3-8 and 11-13 may be embodied in coded instructions stored on any tangible computer-readable medium such as a flash memory, a CD, a DVD, a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other medium that can be used to carry or store program code and/or instructions in the form of machine-readable instructions or data structures, and that can be accessed by a processor, a general-purpose or special-purpose computer, or other machine with a processor (e.g., the example processor platform P100 discussed below in connection with FIG. 14). Combinations of the above are also included within the scope of computer-readable media. Machine-readable instructions comprise, for example, instructions and/or data that cause a processor, a general-purpose computer, a special-purpose computer, or a special-purpose processing machine to implement one or more particular processes. Alternatively, some or all of the example processes of FIGS. 3-8 and 11-13 may be implemented using any combination(s) of ASIC(s), PLD(s), FPLD(s), discrete logic, hardware, firmware, etc. Also, one or more operations of the example processes of FIGS. 3-8 and 11-13 may instead be implemented manually or as any combination of any of the foregoing techniques, for example, any combination of firmware, software, discrete logic, and/or hardware. Further, many other methods of implementing the example operations of FIGS. 3-8 and 11-13 may be employed. For example, the order of execution of the blocks may be changed, and/or one or more of the blocks described may be changed, eliminated, sub-divided, or combined. Additionally, any or all of the example processes of FIGS. 3-8 and 11-13 may be carried out sequentially and/or carried out in parallel by, for example, separate processing threads, processors, devices, discrete logic, circuits, etc.

Figure 3:
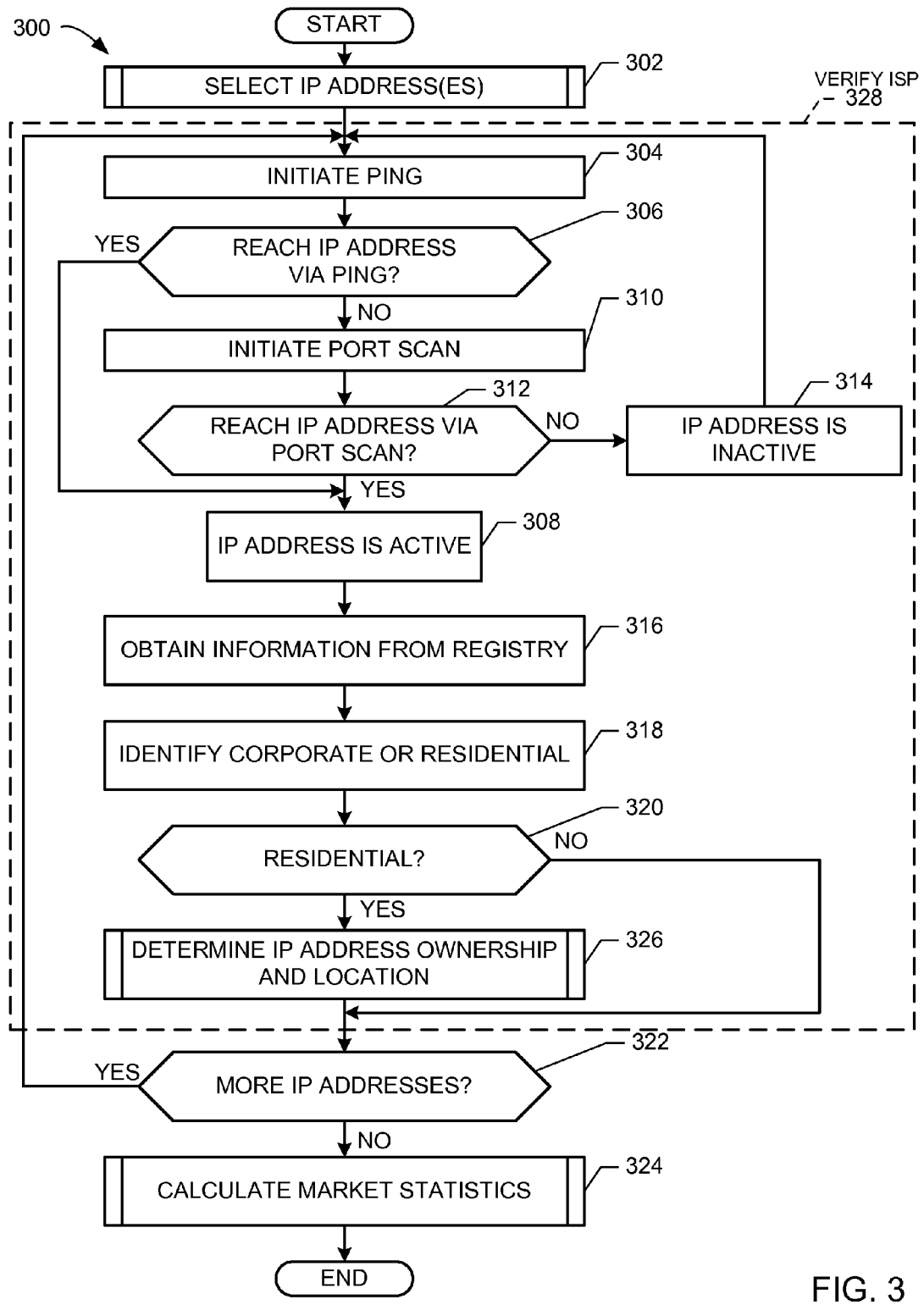
FIGS. 3-8, and 11-13 are flowcharts representative of examples processes that may be performed to implement one or more entities of the example systems and apparatus of FIGS. 1, 2, and 10, and/or the example data charts of FIGS. 9A and 9B.

The example process 300 of FIG. 3 begins with the example test manager 202 selecting a candidate IP address to test (block 302). Candidate IP addresses may be retrieved from the example market information database 106 based on the IP address(es) associated with known panelists, and/or candidate IP address(es) may be acquired from the example registry database 104 in response to a query associated with an ISP of interest. For example, the example test manager 202 may query the registry database 104 (e.g., the ARIN database) using an organization name (e.g., Verizon) to determine whether the organization has registered one or more IP addresses and/or blocks of IP addresses (block 302).

Figure 4:
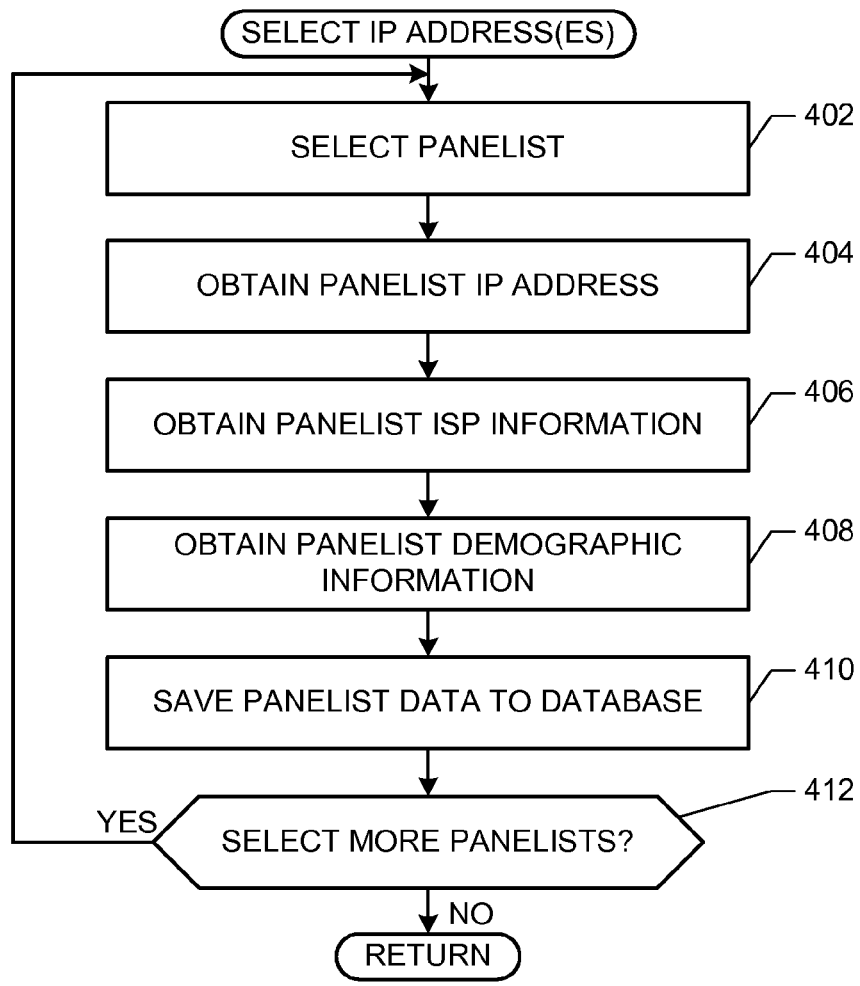

Turning briefly to the illustrated example process 400 of FIG. 4, the example test manager 202 may invoke the example panelist updater 216 to obtain panelist IP addresses to test and/or re-test. Generally speaking, because many ISPs assign IP addresses to subscribers in a dynamic manner rather than statically, such assigned IP addresses are subject to periodic expiration and reassignment. Accordingly, the one or more panelists may agree to disclose their current IP address, and/or otherwise allow home monitoring equipment to operate within the panelist household that periodically, manually, aperiodically, and/or on a scheduled basis report the current IP address. Without limitation, the home monitoring equipment may invoke an application (e.g., ipconfig) and/or script on one or more household personal computers to determine which IP address has been assigned to the panelist household.

In the illustrated example of FIG. 4, the example panelist updater 216 selects a panelist from the market information database 106 (block 402) and obtains the current IP address associated with that panelist (block 404). Additionally, the example panelist updater 216 may obtain, via survey and/or household monitoring device(s) (e.g., Nielsen® People Meter) other panelist ISP information (block 406). Panelist ISP information may include, but is not limited to, the ISP business name, the type of ISP services provided to the panelist household (e.g., DSL Internet services, cable Internet services, fiber optic services (FiOS), etc.). Without limitation, the example panelist updater 216 may obtain panelist demographic information from the example market information database 106, surveys, and/or the household monitoring device(s) (block 408). In the event that new and/or additional information is obtained via one or more surveys and/or via the household monitoring device(s) associated with, for example, Nielsen® online audience measurement services, such information is saved to the market information database 106 for future use (block 410). For example, one or more iterations through the illustrated example process 400 of FIG. 4 gathers additional candidate IP addresses for testing, as described in further detail below. IP addresses obtained through the one or more iterations may be saved to a memory and/or database for individual testing, which determines, in part, an active or inactive status of each candidate IP address. Accordingly, the example panelist updater 216 and/or the IP address aggregator 204 determines whether there are additional panelists to check (block 412) so that, in part, the example test manager 202 has a sufficient and/or statistically significant number of candidate IP addresses to make one or more market statistic conclusions having a requisite degree of confidence.

Figure 5:
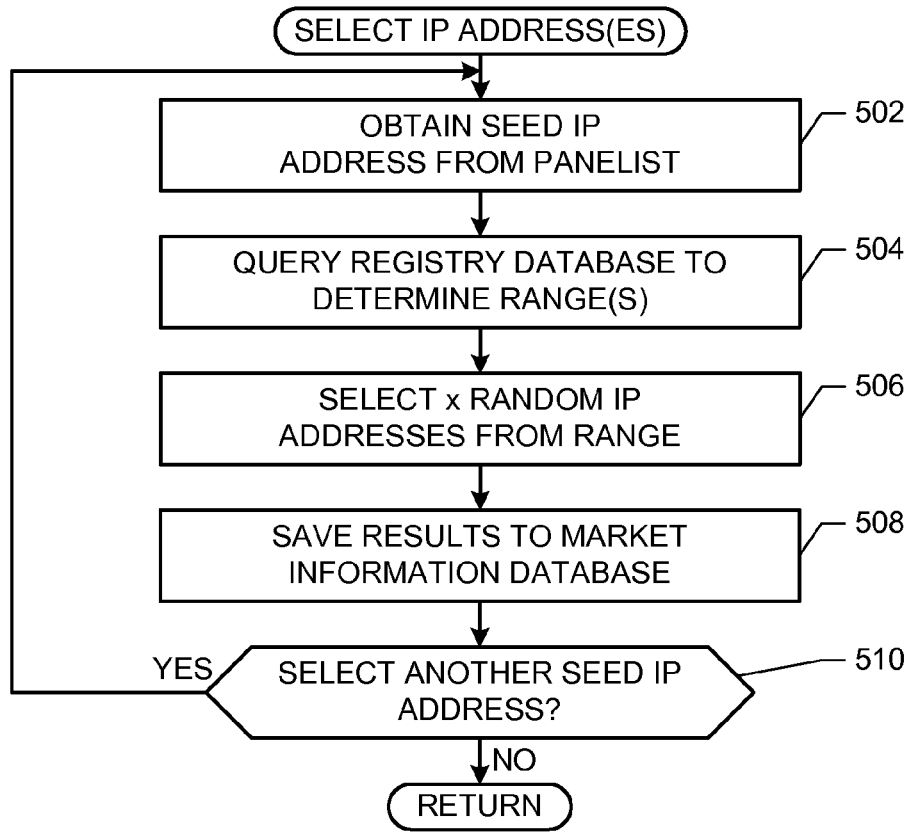

While the illustrated example process 400 of FIG. 4 obtains one or more candidate IP addresses for testing from panelists, the illustrated example process 500 of FIG. 5 also obtains candidate IP addresses for testing by determining whether the IP address registrant also manages one or more blocks of neighboring IP addresses. The example panelist updater 216 obtains a seed IP address from a panelist by querying the list of panelists stored in the example market information database 106 (block 502). Using the seed IP address as input for a query to the registry database 104, such as the ARIN database, the example registry manager 210 obtains information to indicate whether the seed IP address has one or more neighboring IP addresses also managed and/or registered by the same organizational entity (block 504). For example, a query to the ARIN database using a panelist seed IP address of 69.47.21.141 reveals, in part, an organization name "WideOpenWest Finance LLC," which has registered IP addresses ranging from 69.47.0.0 through 69.47.255.255. Based on this discovered range of IP addresses registered by the same organization, the example test manager 202 selects a random number of IP addresses to test (block 506). The selected random IP addresses may be temporarily saved by the test manager 202 in a queue or memory, and the information related to the known range of registered IP addresses for the organization are saved in the example market information database 106 (block 508) for future use. In other words, rather than perform another query to one or more registry databases 104 to determine a range of IP addresses registered by "WideOpenWest Finance LLC," the test manager 202 may, instead, select another group of random IP addresses to test from the market information database 106. If another seed IP address is to be selected (block 510) to, for example, acquire a greater number of IP addresses to satisfy a statistically significant threshold, control returns to block 502. Additionally, after saving the results to the example market information database 106 (block 508), a subsequent attempt to obtain an IP address to test by the market share evaluator 102 may not require any further queries to one or more registry databases 104. Instead, the example test manager 202 may acquire candidate IP addresses directly from the market information database 106, which are identified as being associated with a specific ISP.

Returning to the illustrated example process 300 of FIG. 3, after any number of IP addresses are selected (block 302), the example ping manager 206 performs a ping operation using one of the selected candidate IP addresses (block 304) to determine whether echo response messages are received and, if so (block 306) the selected candidate IP address is deemed active (block 308). In other words, the example ping manager 206 determines an activity status of the candidate IP address of interest. On the other hand, if the ping operation does not successfully return one or more echo response messages (block 306), the example test manager 202 directs the port scan manager 208 to initiate a port scan (block 310) and, if successful (block 312), the selected IP address is deemed active (block 308). However, if the port scan is not successful (block 312), the selected IP address is deemed inactive (block 314) and control returns to block 304 to select another candidate IP address to test.

IP addresses that are deemed active (block 308) by either a ping or port scan are further used as input for a query to one or more registry databases 104 (block 316), such as the ARIN database. Information retrieved from the registry databases 104 may include, but is not limited to, the name and/or address of the organization that registered the selected IP address, whether the named organization has also registered other IP addresses and/or one or more blocks of IP addresses, and/or a contact name, telephone number, and/or e-mail address of a contact responsible for the IP address. IP addresses that are associated with corporations, hospitals, schools, universities, and/or similar businesses and/or organizations are distinguished from IP addresses associated with residential use by the example market share evaluator 102 (block 318).

In particular, the example registry manager 210 compares the returned organization name with identified organization names stored in the market information database 106. The example market information database 106 includes at least one parameter associated with organization names to identify whether the organization is residential, meaning it provides IP addresses for residential purposes, or whether the organization is non-residential, meaning that it provides and/or otherwise manages IP addresses for corporate, scholastic, and/or any other non-residential purpose (block 318). If the IP address is not residential (block 320), then the example test manager 202 determines whether there are additional IP addresses of interest to test (block 322) and, if so, control returns to block 302. Otherwise, if the example test manager 202 determines that there are no additional IP addresses of interest to test, market share statistics are calculated based on the acquired test results (block 324), as described in further detail below.

In the event that the IP address is deemed residential (block 320), the example market share evaluator 102 determines a corresponding location of the IP address and performs a secondary test to identify a true end user (block 326) as compared to the registrant identified by one or more registry databases (e.g., the organization associated with OrgName by the ARIN database). As described above, the organization identified as responsible for a registered IP address may not be the ultimate end-user, but rather a reseller of IP addresses.

Figure 6:
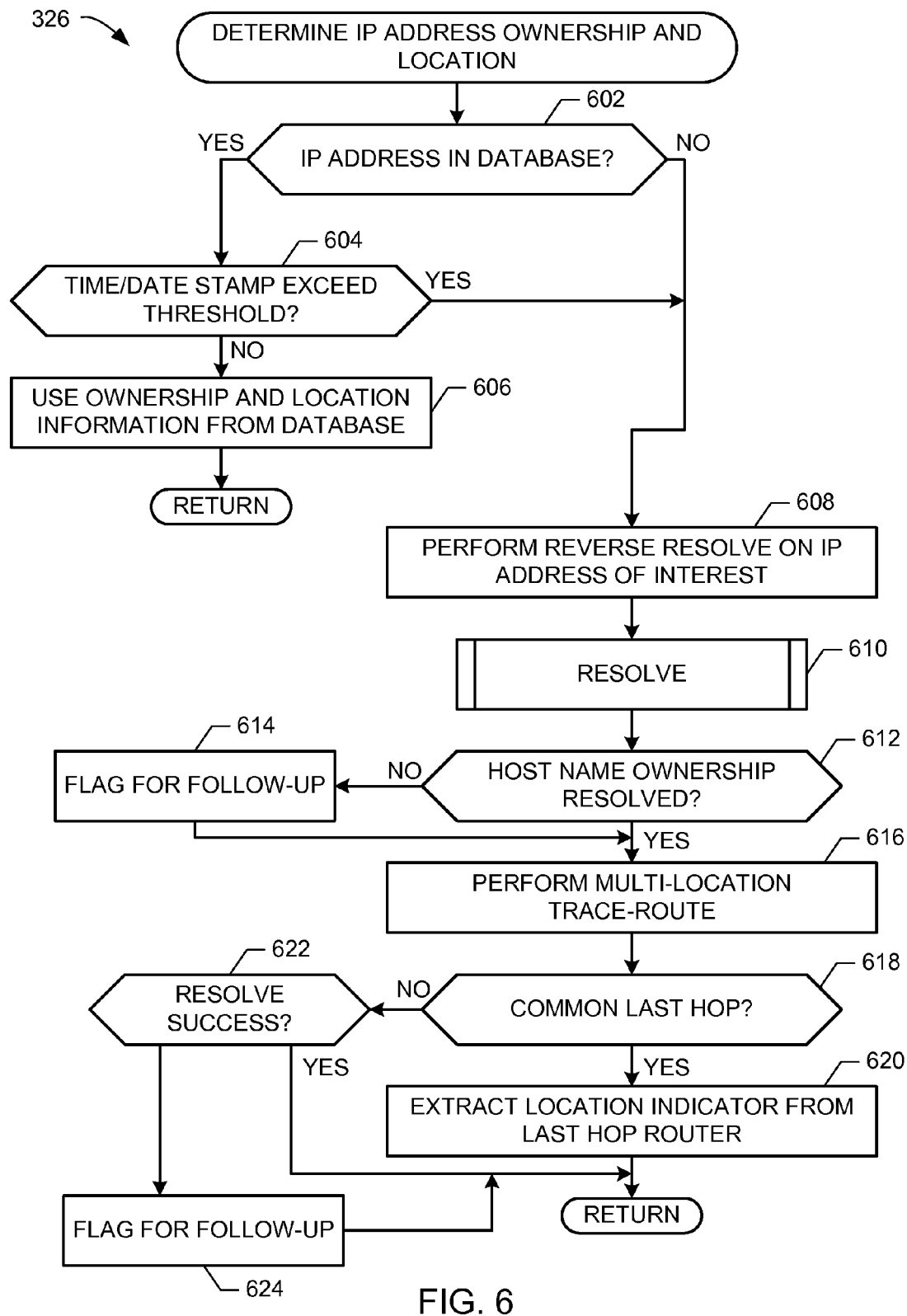

FIG. 6 illustrates the example process 326 to determine a corresponding location of the IP address and perform the secondary test to identify the true end user. In the illustrated example of FIG. 6, the example test manager 202 determines if the IP address of interest is stored in the example market information database 106 (block 602). If so, then the example market share evaluator 102 may not need to expend additional processing resources and/or time to determine true ownership and location information in the event that the stored information is relatively recent. As such, the example test manager 202 determines whether the information associated with the IP address of interest exceeds a date and/or time threshold, which serves as an indication of how recent or current the stored information is. If the threshold is not exceeded (block 604), thereby indicating that the IP address information stored in the example market information database 106 is relatively recent or current, such stored information is relied upon to confirm the true owner and location of the IP address of interest (block 606).

On the other hand, in the event that the IP address of interest is not stored in the example market information database 106 (block 602) or the time/date threshold is exceeded (block 604), then the example hostname resolver 212 performs a reverse DNS lookup (also referred to as a reverse-resolve) using the IP address of interest to retrieve an associated hostname (block 608). An example response to a reverse DNS lookup using the IP address of interest 68.87.148.146 is "ge-0-1-ubr01.warren.ma.boston.comcast.net." Also note that an example response to an ARIN database Whois query using this same IP address of interest to identify the organization name is "Comcast Cable Communications, Inc." Accordingly, both the reverse DNS lookup and the registry database lookup identify the same end-user entity.

However, in some circumstances the organization name from the ARIN query and the reverse DNS will not match, such as when the example IP address of interest is 64.236.16.20. In this example, the ARIN query identifies the organization responsible for registering the IP address as "AOL Transit Data Network." On the other hand, a reverse DNS using the same IP address of interest reveals "www2.cnn.com." To resolve such a disparity and determine the true end user associated with the IP address of interest, the example hostname resolver 212 compares reverse DNS labels with labels stored in the example market information database 106 (block 610), as described in further detail in connection with FIG. 7.

Figure 7:
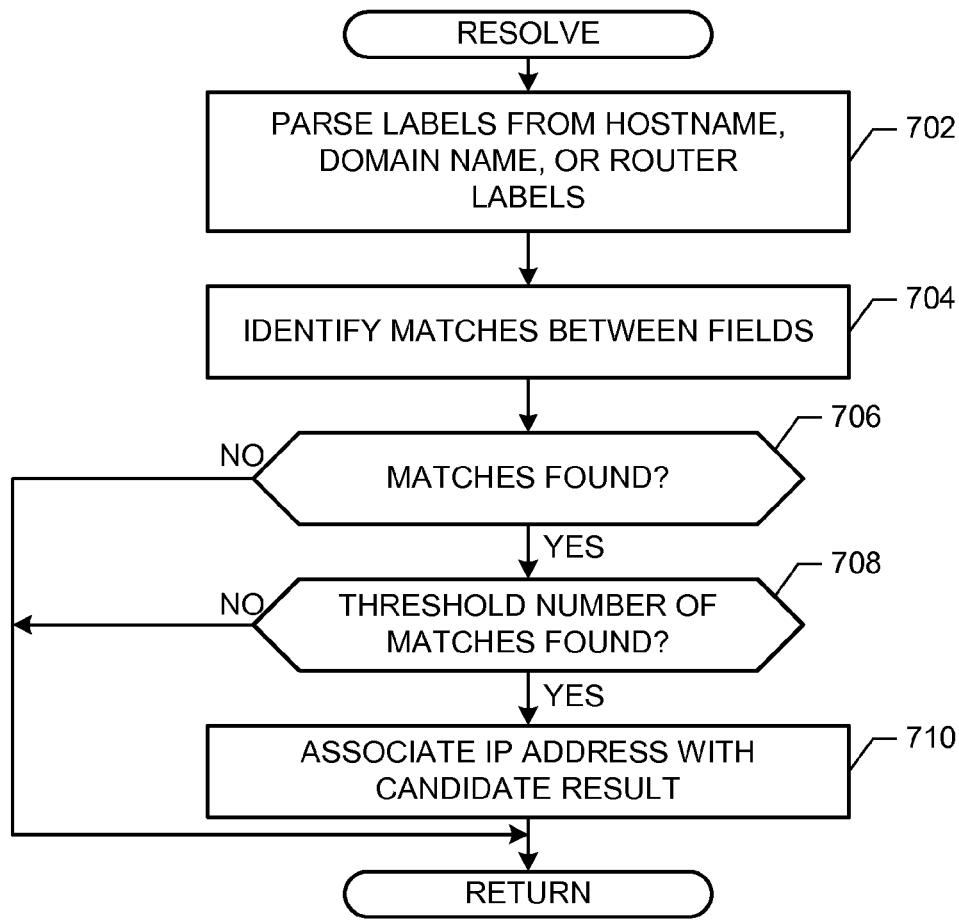

In the illustrated example of FIG. 7, the example hostname resolver 212 parses and places received hostname, domain name, and/or router labels in separate fields (block 702) and identifies whether the labels satisfy a match of known residential ISPs stored as resolution keywords in the resolution keyword table 107 of the example market information database 106 (block 704). The one or more keywords in the example resolution keyword table 107 may include, but are not limited to, letters, words, numbers and/or one or more alphanumeric representations that are indicative of an ISP, an organization, and/or a location. In other words, the example hostname resolver 212 applies one or more rules to identify a valid ISP associated with a combination of labels parsed from a received hostname. Continuing with the example above, the hostname "ge-0-1-ubr01.warren.ma.boston.comcast.net" may be analyzed by the hostname resolver 212 so that the labels "ma," "boston," and "comcast" are parsed-out for comparison purposes. In this example, the hostname resolver 212 includes a rule in which these three labels, when all identified within a single received hostname, result in identification of Comcast® as the ultimate end-user ISP.

However, assuming that the returned hostname was, instead, "ge-0-1-ubr01.warren.ma.comcast.net," then the example rule that requires at least three specific labels for proper identification of Comcast® would not be satisfied. Despite the fact that one of the labels includes "comcast," the possibility exists that Comcast® redistributes (e.g., a reseller) the IP address to a separate ISP. Accordingly, Comcast® and/or its residential customers would not be the ultimate end-user in this example, thus the IP address of interest cannot be properly associated with a conclusive end-user. Continuing with the example process 610 of FIG. 7, the example hostname resolver 212 determines if any label matches are found in the market information database 106 (block 706) and, if so, whether the required number of threshold label matches have been detected (block 708). If the required number of threshold label matches have been met (block 708), then the IP address of interest is associated with the ISP identified in the market information database 106 and/or a candidate result (block 710).

Returning to FIG. 6, if the hostname ownership is not resolved after one or more queries to the market information database 106 as described in connection with FIG. 7 (block 612), then the received hostname from the reverse DNS is flagged for manual follow-up (block 614). The manual follow-up may include, but is not limited to one or more users investigating new, alternate, and/or otherwise unrecognized label keywords to determine an associated ISP organization name and/or corresponding location. Such newly discovered information may further be appended to the example market information database 106 and/or resolution keywords 107 so that future/subsequent circumstances allow immediate resolution when those label keywords are encountered. This circumstance may arise in the event a new ISP enters the market having hostname labels not previously identified during one or more tests of IP addresses. As a result, the market information database 106 described herein continues to become more complete the longer it is used with the methods and apparatus described herein to measure broadband market statistics.

If, on the other hand, the received hostname is resolved (block 612), then the example hostname resolver 212 initiates a multi-location trace-route (block 616) to confirm a common last hop router hostname (block 618). For example, if a first trace-route for the IP address of interest 68.87.148.146 originates in San Francisco (e.g., initiating router hostname "bdrrtr-a.22.c4.sf2.telephia.com"), a second trace-route for the same IP address originates in Dallas (e.g., initiating router hostname "tbr1.dlstx.ip.att.net"), and a third trace-route for the same IP address of interest originates in Lindbergh (e.g., initiating router hostname "host-criterion-83-225.customer-.ntelos.net") all identify a last hop router hostname "ge-0-1-ubr01.warren.ma.boston.comcast.net," then the labels indicative of location are extracted to identify the corresponding city and/or state in which the IP address of interest is located (block 620). In this example, the label cues "boston" and "ma" identify the city of Boston in the state of Massachusetts. However, in the event that there is no indicator of location in the hostname, then any information in the example market information database 106 will be used.

If, instead, all three trace-routes do not identify a common last hop router hostname (block 618), then the example hostname resolver 212 compares each returned hostname for a match in the example market information database 106 and resolves a corresponding location if a match is found (block 622), otherwise the IP address of interest is flagged for follow-up (block 624).

Figure 8:
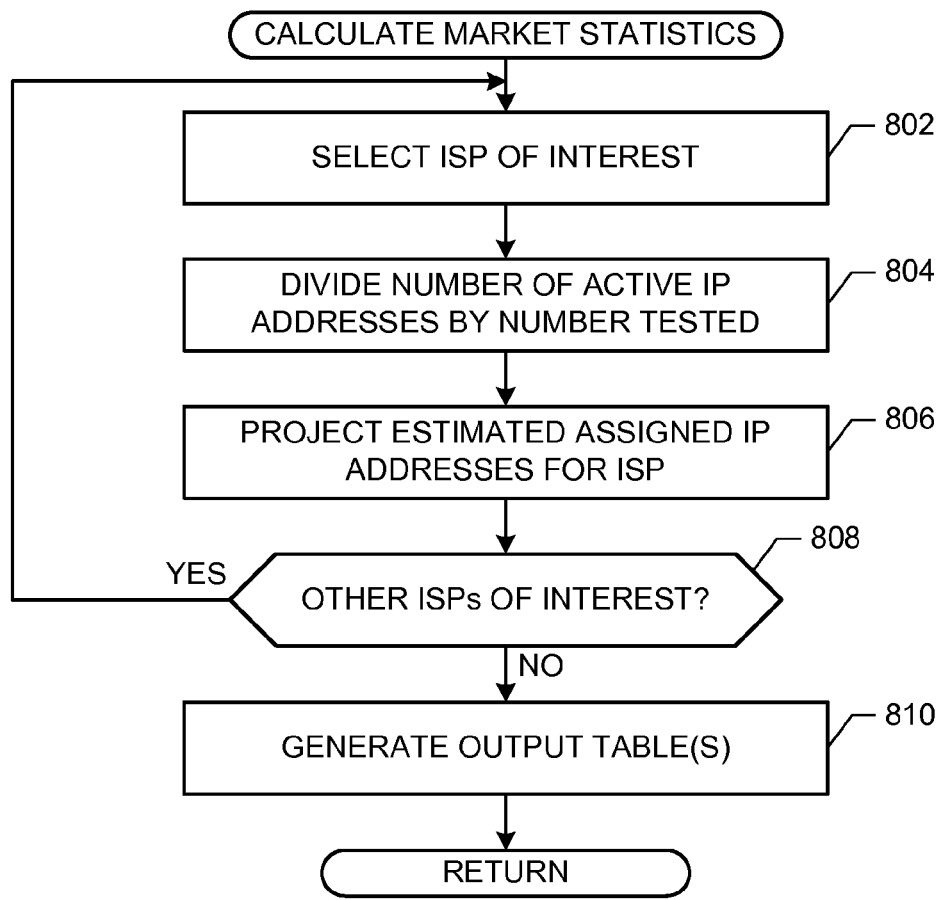

Returning to the illustrated example process 300 of FIG. 3, if the test manager 202 does not have any additional IP addresses of interest to test (block 322), then the test manager 202 calculates one or more broadband market statistics (block 324) such as, for example, market share. The illustrated example process 300 of FIG. 3 also includes an example sub-process 328 (dashed-line) that may be performed by a calling process, as described in further detail below in connection with FIG. 11. Turning to FIG. 8, the example test manager 202 selects an ISP of interest for which broadband market statistics are desired (block 802). Data returned from the one or more iterative tests of IP addresses is stored in the market information database 106, and for each ISP of interest the number of detected active IP addresses is divided by the total number of IP addresses tested to yield a percentage of active IP addresses for the given time period (block 804). In the event that the total number of IP addresses tested satisfies a threshold value indicative of a statistically significant sample size, the example test manager 202 calculates one or more projection estimates for the ISP of interest in the given market area (e.g., the first market area 118, the second market area 120, etc.) (block 806). For example, if a number of assigned IP addresses is found to be 325 out of 500 IP addresses tested, then a factor of 0.65 is calculated as factor indicative of active IP addresses. Additionally, if the ISP of interest is believed to control a quantity of, for example, 10,000 IP addresses (e.g., as determined from one or more registry databases, such as the ARIN database), then a total number of active IP addresses may be calculated/projected as 6,500 (e.g., 325÷0.05, or 0.65×10,000). If the user desires to calculate one or more broadband market statistics for alternate ISPs (block 808), then control returns to block 802, otherwise one or more output tables may be generated for the user (block 810), such as the example output tables 900 and/or 950 shown in FIGS. 9A and 9B.

Figure 9A:
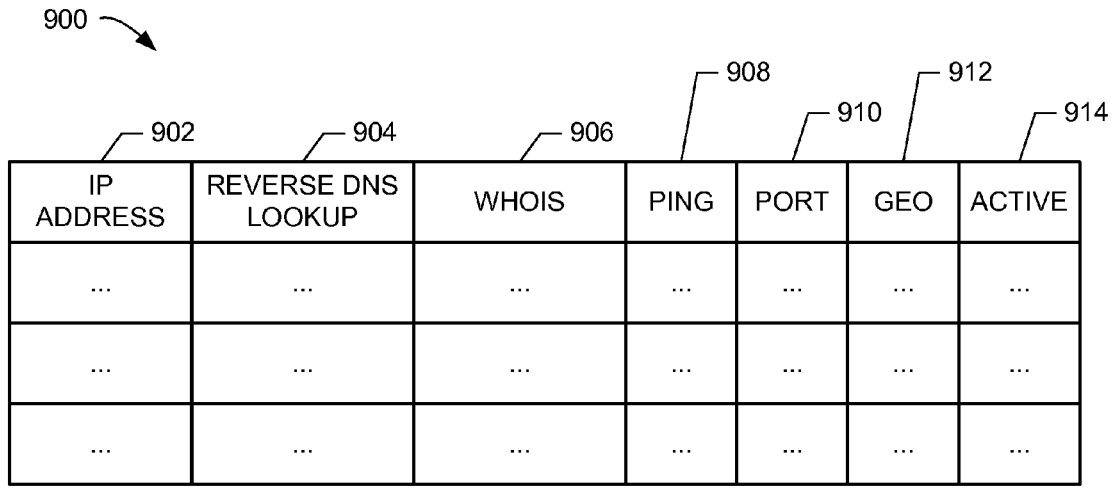
FIGS. 9A and 9B are example data charts generated by the example systems and apparatus of FIGS. 1, 2, and 10 and/or the example processes of FIGS. 3-8 and 11-13.

The example data output table 900 of FIG. 9A includes an IP address column 902, a reverse DNS lookup column 904 to identify a hostname corresponding to the IP address, a Whois column 906 to identify a corresponding registrant name associated with the IP address, a ping column 908 to identify whether or not a ping operation was successful, and a port column 910 to identify whether or not one or more port scanning operations were successful. Additionally, the example table 900 of FIG. 9A includes a geography column 912 to identify the location of the IP address, and an active column 914 to identify whether the IP address of column 902 is active or inactive.

Figure 9B:
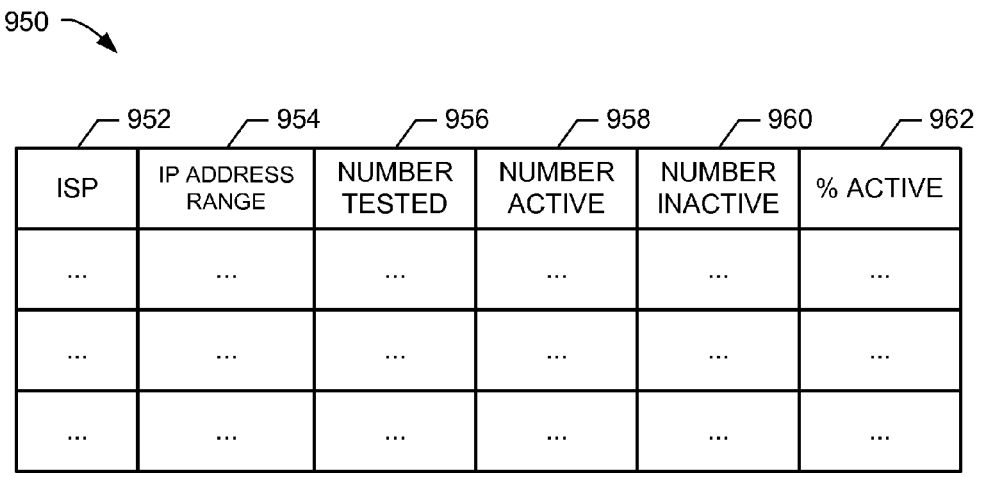

The example data output table 950 of FIG. 9B includes an ISP column 952, an IP address range column 954 to identify which groups of IP addresses (e.g., one or more grouped ranges of IP addresses) the ISP is responsible for, a number of IP addresses tested column 956 to identify the total number of IP addresses tested from the pool of IP addresses in column 954, and a number of active IP addresses column 958. The example data output table 950 also includes a number of inactive IP addresses column 960 and a corresponding percentage of active IP addresses based on the total number of IP addresses tested column 962. While FIGS. 9A and 9B illustrate two example data output tables that may be generated and/or calculated by the example market share evaluator 102, the methods and apparatus described herein are not limited thereto. Any other data output arrangement may be generated by the market share evaluator 102 to accommodate for varying needs of the user(s) such as, but not limited to, ranked data tables to illustrate ISPs having the largest or smallest market share for a city, a state, a region, and/or data tables to illustrate a rate of change in subscribers from one time period to another time period. Additionally, the example data tables 900 and 950 calculated by the example market share evaluator 102 may also identify one or more trends related to subscriber increases, subscriber decreases, and/or one or more effects in response to advertising and/or promotional efforts. For example, the ISP using the methods and apparatus described herein may establish a baseline broadband subscriber share and/or a rate of new subscribers for the ISP and/or competitors of the ISP prior to initiating one or more advertising and/or promotional campaigns. During such advertising and/or promotional campaigns, the ISP may continue to employ the methods and apparatus described herein to determine the effect of such advertising efforts (e.g., a threshold gain in the percentage of subscribers, an increase in the rate of new subscribers, etc.).

FIG. 10 is an illustration of an example system 1000 to measure market share and calculate flow share. The methods and apparatus described herein may measure and/or otherwise calculate market share and/or flow share for broadband markets (e.g., broadband Internet services, fiber Internet services, etc.) and/or video markets (e.g., over the air services, satellite services, cable services, etc.). For the sake of brevity, the example system 1000 of FIG. 10 includes elements similar to those in the example system 100 of FIG. 1 and similar reference numbers are shown in FIG. 10 to represent similar elements. In the illustrated example of FIG. 10, the system 1000 includes a United States Census Bureau database 1050, a managed panel database 1052, a convenience database 1054, and a survey pool 1056. The example US Census Bureau database 1050 includes information related to US demographics for the Northeastern United States, the Midwestern United States, the Western United States, and the Southern United States. As described in further detail below, the example US Census Bureau database 1050 provides one or more benchmarks when applying weighting factors to household data. The example managed panel database 1052 includes, in part, panelist data having a relatively high confidence representation of demographic groups. For example, the managed panel database 1052 confidence allows for projections to a larger universe of a demographically identified population based on one or more statistical guidelines that conform to the Interagency Council on Statistical Policy (ICSP), which is led by the United States Office of Management and Budget.

The example convenience database 1054 includes data and/or panelists associated with one or more households, but is not managed in a manner to conform to the ICSP. For example, the convenience database 1054 may include panel sample sizes of a relatively lower amount than the example managed panel database 1052 and, as a result, cost significantly less to maintain. One or more projections applied in view of the example convenience database 1054 include an associated confidence level that is lower than that of the example managed panel database 1052. Similarly, the example survey pool 1056 includes survey questions and corresponding survey answers from available participants. Such survey answers provide data at a significantly lower operating cost when compared to the managed panel database 1052 and/or the convenience database 1054, but may also include a relatively lower confidence level.

To calculate market share and/or flow share in view of available data provided by the example convenience database 1054, which provides, in part, additional insight into household broadband and/or video provider consumer selections, multiple data sources are employed in a hybrid manner. Available data in the one or more convenience databases may include, but is not limited to, any number of indications of associated IP address status, such as a new subscriber ISP, an unchanged ISP associated with an IP address having a new home address, and/or a service type (e.g., dial-up, broadband, fiber, video, etc.) For example, an overall market size and/or market penetration of Internet use is provided by the managed panel database 1052, while information related to specific ISPs is provided by the example convenience database 1054 in view of particular geographic locations. To calculate flow share data in view of available data provided by the example convenience database 1054 and available survey data, which allows an indication of new movers, disconnects, and/or new inwards for the service providers, multiple data sources are employed in a hybrid manner, as described in further detail below.

Figure 11:
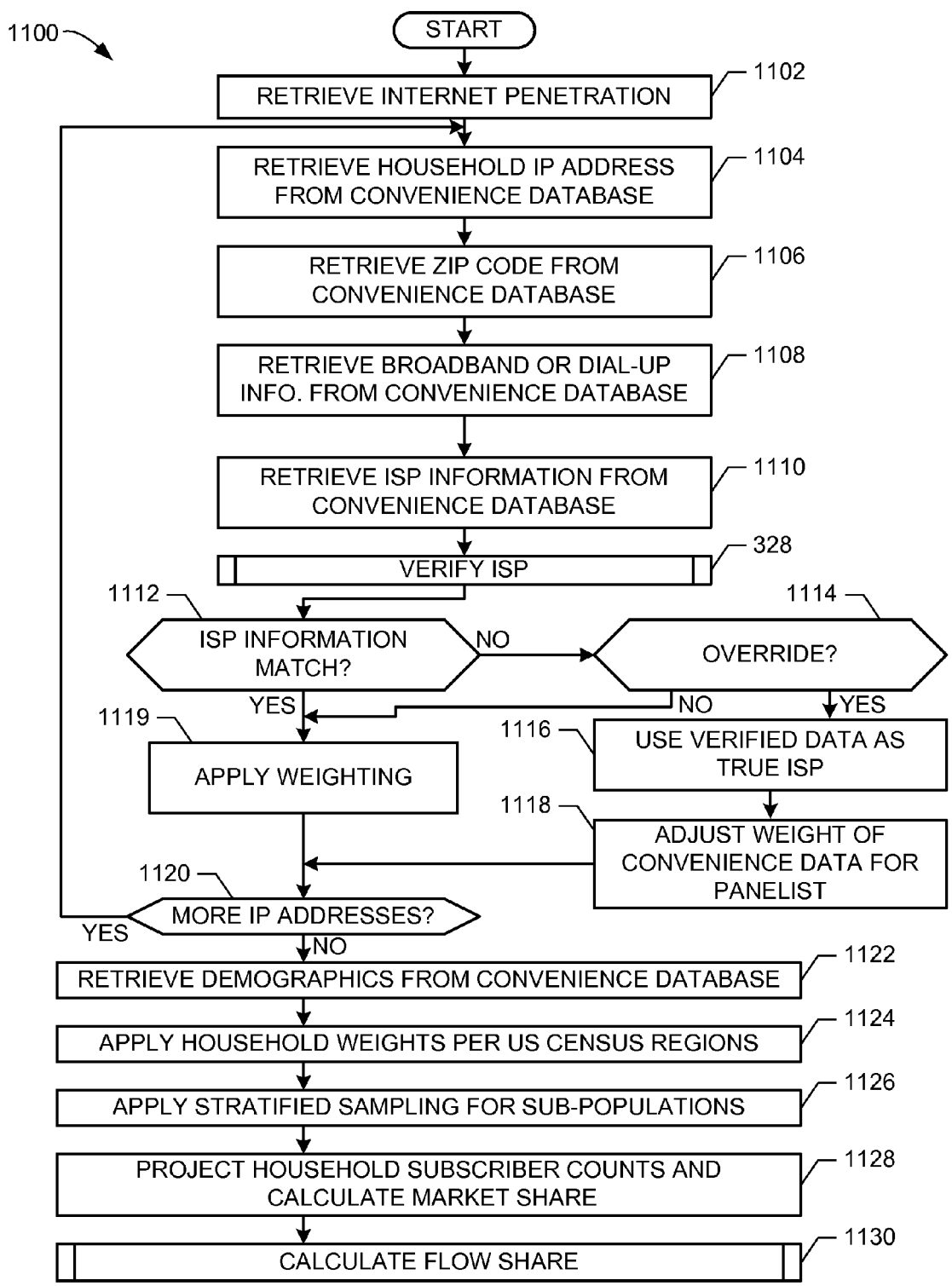

FIG. 11 illustrates an example process 1100 to calculate service provider flow share using information from one or more managed databases and one or more convenience databases, such as the example managed panel database 1052 and the example convenience database 1054. While the examples described in connection with FIG. 11 include both managed and convenience databases, the methods and apparatus described herein may use only managed or only convenience databases instead. If so, samples sizes and weights associated with such databases may be adjusted to maintain statistical integrity of one or more projections and/or calculations. In the illustrated example of FIG. 11, the example test manager 202 queries the managed panel database 1052 to acquire a service penetration value (block 1102), such as a value of Internet services and/or video services (e.g., Internet based video services). The received Internet penetration value includes service subscribers, such as subscribers of dial-up, broadband, video, and/or fiber-based services, but does not typically identify which service provider is responsible for those services. While the example managed panel database 1052 reports, for instance, an Internet penetration value associated with one or more demographic groups and/or one or more geographic areas believed to be highly representative, the management of the managed panel database 1052 may require that some households be dropped from the panel while new households be added in an effort to maintain the relatively high degree of representation in conformance with ICSP. To bridge a gap in information not available to the example managed panel database 1052, the example test manager 202 queries the convenience database 1054 to retrieve a valid household IP address associated with a panel member. Each household member associated with the example convenience database 1054 includes an associated household identification number so that, in part, changes in household activity may be tracked from one time period to another time period. Additionally, each household member associated with the example convenience database 1054 includes monitoring equipment and/or monitoring software that reports a current IP address on a periodic, aperiodic, manual, and/or scheduled basis. As a result, in the event that the household associated with the household identification number reports a different IP address at a later time period, the methods and apparatus described herein may identify that the household may have changed Internet service providers.

The household members associated with each household identification number in the convenience database 1054 also provide information related to their geographic location (e.g., zip code), which is retrieved by the example test manager 202 (block 1106). Additionally, the example test manager 202 retrieves information reported by the household members to identify whether they have dial-up, broadband, fiber, or other Internet services (block 1108), and retrieves information reported by the household members to identify which ISP provides such Internet services (block 1110). However, because the example convenience database 1054 is not a managed database, the possibility exists that the self reported information from the household members is not accurate. To verify whether the self reported ISP information retrieved by the example test manager 202 (block 1110) is accurate, the test manager 202 invokes an example ISP verification process 328 (as shown by the dashed border of FIG. 3), as described above in connection with FIGS. 3, 6, and 7.

In the illustrated example process 1100 of FIG. 11, the test manager 202 determines whether the ISP information from the convenience database 1054 matches the ISP information from the example ISP verification process 328 (block 1112). If not, the example test manager 202 determines whether to override the ISP information in the convenience database (block 1114) based on, for example, an instruction from a user of the example system 1000 and/or in circumstances when the ISP verification process 328 is not capable of identifying the ISP. If the ISP information is to be overridden (block 1114), the example test manager 202 uses the ISP information retrieved from the ISP verification process 328 as the trusted ISP for a given panelist from the convenience database 1054 (block 1116), and one or more weighting adjustments are applied to the information associated with the given panelist identification number stored in the convenience database 1054 to reflect a confidence factor and/or reliability of information associated with the panelist (block 1118).

However, if the ISP information matches (block 1112) or if the convenience database 1054 ISP information is not to be overridden (block 1114), or if the convenience database 1054 matches the ISP information (block 1112), then the example test manager 202 applies a weighting factor indicative of a greater degree of confidence in the data integrity/accuracy of the convenience database 1054 (block 1119). For example, the applied weighting factor (block 1119) may include a unity weight (e.g., 1.00) in the event that the convenience database 1054 is highly trusted (e.g., due to a relatively large number of samples, due to a degree of consistency as compared to a managed database and/or ICSP standards, etc.). On the other hand, the example test manager 202 may apply a default weight to one or more convenience databases indicative of a decreased degree of confidence by virtue of the fact that the database is not managed.

The example test manager 202 continues to evaluate any remaining panelist information and associated IP addresses in the convenience database (block 1120). In the event that there are additional panelists to evaluate (block 1120), control returns to block 1104, otherwise the example test manager 202 retrieves household demographic information from the convenience database (block 1122), such as, but not limited to indicators of race, marital status, income, and/or education. Additionally, the example data source weight calculator 220 applies one or more household weighting factors to reflect benchmarks associated with U.S. Census region data from the example U.S. Census database 1050 (block 1124). The applied census weights allow, in part, a reduction of the bias associated with the convenience data source (e.g., database) by confirming that the convenience database aligns in a manner with a more reliable standard source (i.e., the U.S. Census database 1050). In view of the possibility that one or more census region(s) include sub-populations of additional and/or alternate demographic presence, the example test manager 202 applies a stratified sampling to such sub-populations within each census region (block 1126). Additionally, the application of the stratified sampling allows for control (e.g., minimize) of one or more geographic biases. Projections of household subscriber counts are performed by the example test manager 202 based on the stratified sampling output to yield market share for each ISP within a given geography of interest (block 1128). Based on the resolution, representation, and/or confidence level of the example convenience database 1054, the one or more market share projections may be made at a direct marketing area (DMA) level or, if a threshold confidence level is met and/or exceeded, a city and/or township level may be projected having increased granularity. The example test manager 202 may then calculate broadband flow share (block 1130).

Figure 12:
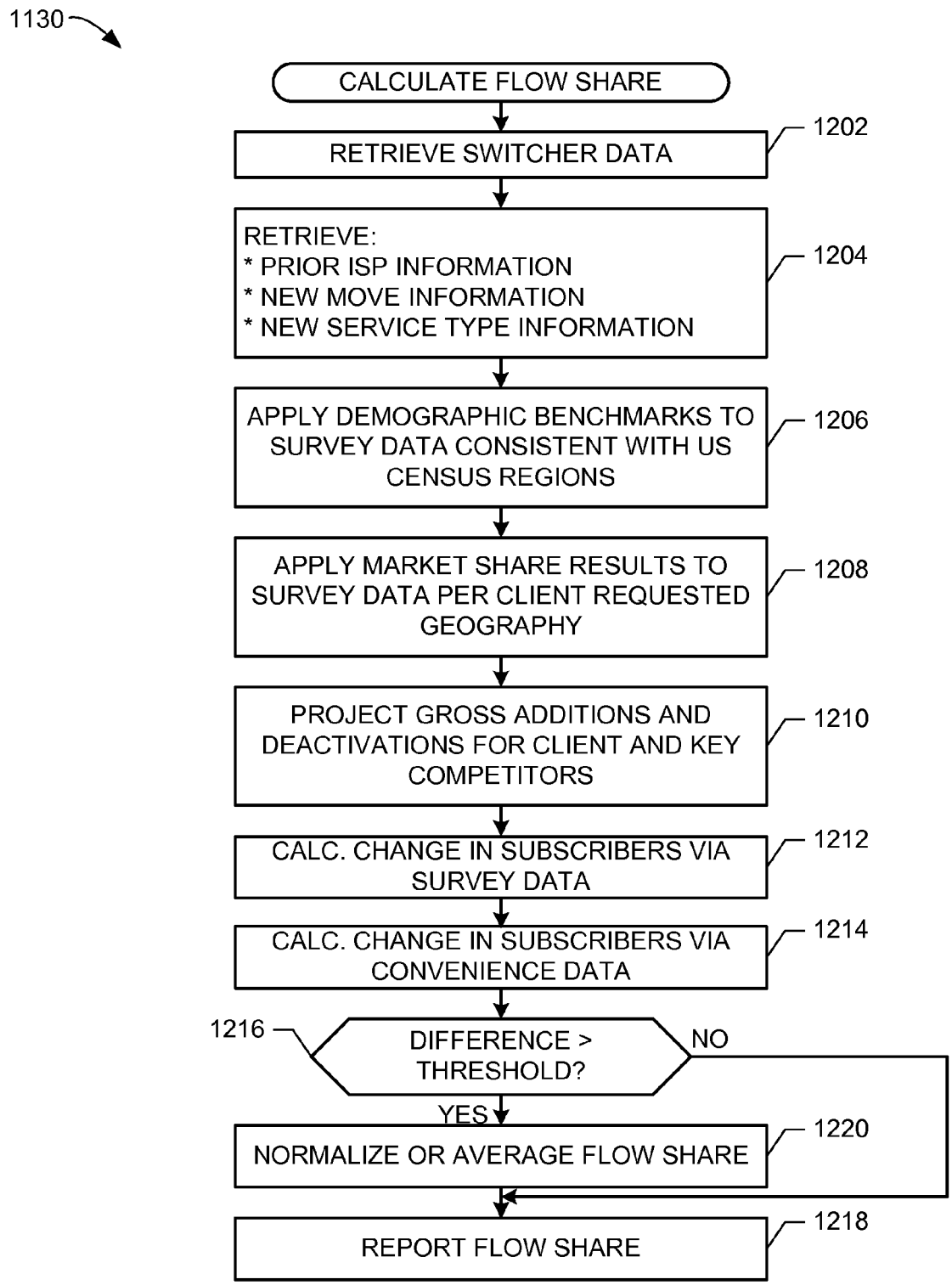

FIG. 12 illustrates an example process 1130 to calculate broadband flow share using information from the one or more managed panel databases 1052, convenience databases 1054, and survey data from the example survey pool 1056. While the example survey pool data 1056 includes a more economic manner in which to obtain respondent/customer feedback and other information, the sample size required to project to larger populations becomes cost prohibitive. Additionally, because the survey pool data 1056 is not typically managed and/or verified to be within one or more measured levels of representation, the possibility of incorrect answers from survey respondents exists. However, survey pool data 1056 includes valuable information related to broadband gross additions, new movers, and/or new inward behaviors. The example survey pool data 1056 may include, but is not limited to diary data.

An example process 1200 is shown in FIG. 12 to calculate one or more flow share measurements that identify gross additions, new movers, and/or new inward behaviors associated with service providers. In the illustrated example of FIG. 12, the example test manager 202 retrieves one or more indications of an IP address switch from the example convenience database 1054 (block 1202). To determine information related to prior customer/subscriber ISP information, whether the customer/subscriber moved to a new home and obtained a new ISP, whether the customer/subscriber moved to a new home and maintained the same ISP, and/or whether the customer/subscriber obtained a new type of service (e.g., dial-up to broadband), the example test manager 202 retrieves survey responses from the example survey pool 1056 (block 1204). The example survey information obtained from the example survey pool 1056 may include any other types of responses including, but not limited to former ISP names, new ISP names, duration of ISP service, type of ISP service (e.g., dial-up, broadband, cable, DSL, fiber, free Wi-Fi, wireless air card, etc.), and/or one or more service names associated with the ISP (e.g., AT&T UVerse®, etc.).

While the received data from the example survey pool 1056 may contain a sample size significantly lower than that found in a managed data source, the example test manager 202 applies one or more demographic benchmarks to the received survey data in a manner consistent with U.S. census data from the example U.S. Census database 1050 (block 1206). Additionally, the market share projections calculated in connection with the example process 1100 of FIG. 11 are applied to the survey data to constrain flow share volumes in a manner consistent with the key competitive geographies of a selected client/service provider (block 1208). In other words, flow share data returned to a given client may be tailored to be relevant to only those geographic areas in which the given client competes with other service providers. Within each geographic area of interest, the example test manager 202 uses the market share data and benchmarked survey data to project gross adds and deactivations for the client and the key competitors of the client based on known geographic regions of competition (block 1210). In some examples, a change in a provider for a panelist and/or survey respondent may be interpreted as a deactivation and a gross add, while a subscriber that moves to an alternate address may be interpreted as a deactivation and a gross add when that subscriber maintains the same service provider. In other examples, a subscriber that moved to a new address and is new to broadband services may be interpreted as a gross addition, while a subscriber that drops broadband services in favor of, for example, dial-up services may be interpreted as a deactivation. Further, in other examples a broadband subscriber that previously had dial-up service or no service may be interpreted as a gross addition. Net additions may further be calculated as the difference between gross additions and subscriber deactivations.

One or more verification procedures may be performed to ensure that the aforementioned use of survey data includes a threshold level of confidence, thereby increasing the marketable value of the projected flow share data (e.g., gross adds, deactivations, new inroads, new movers, etc.). In the illustrated example process 1200 of FIG. 12, the test manager 202 calculates a difference between gross additions and disconnects to yield a change in the number of subscribers for a given time period (block 1212). Such a calculation is derived from information received from survey pool data. However, information received from the convenience database 1054 may be used by the example test manager 202 to calculate a difference between a client starting and ending subscriber count value to determine a change in the number of subscribers for a given time period (block 1214). In the event that the difference between the calculated number of subscribers for the given time period (blocks 1212 and 1214) does not exceed a threshold value (block 1216), then the projected flow share results are provided in a report for each client (block 1218). However, in the event that the example threshold value is exceeded (block 1216), then the projected flow share results may be averaged, normalized, and/or scaled (block 1220) to better represent expected results for the given client of interest and/or geography of interest.

While the aforementioned examples to calculate market share and/or flow share identified broadband Internet services and broadband ISPs, the methods and apparatus described herein are not limited thereto. For example, the methods and apparatus described herein facilitate calculating market share and/or flow share for media providers, such as providers of satellite, cable, and/or over-the-air services. Similar to the ISPs described above, a stand-alone survey for media providers will not typically allow a cost effective approach to gathering an appropriate sample size to meet statistically significant requirements for a target geography. Although one or more managed data sources, such as the example managed panel database 1052 of FIG. 1, include panelist data having a relatively high degree of geographic and demographic representation (e.g., one or more managed databases that satisfy standards promulgated by the ICSP), such managed data sources may still have an insufficient sample size to allow projection(s) to a larger population. While adding highly managed panelists to a managed database may allow for a sufficient sample size for purposes of projection, cost restraints may prohibit such efforts.

Figure 13:
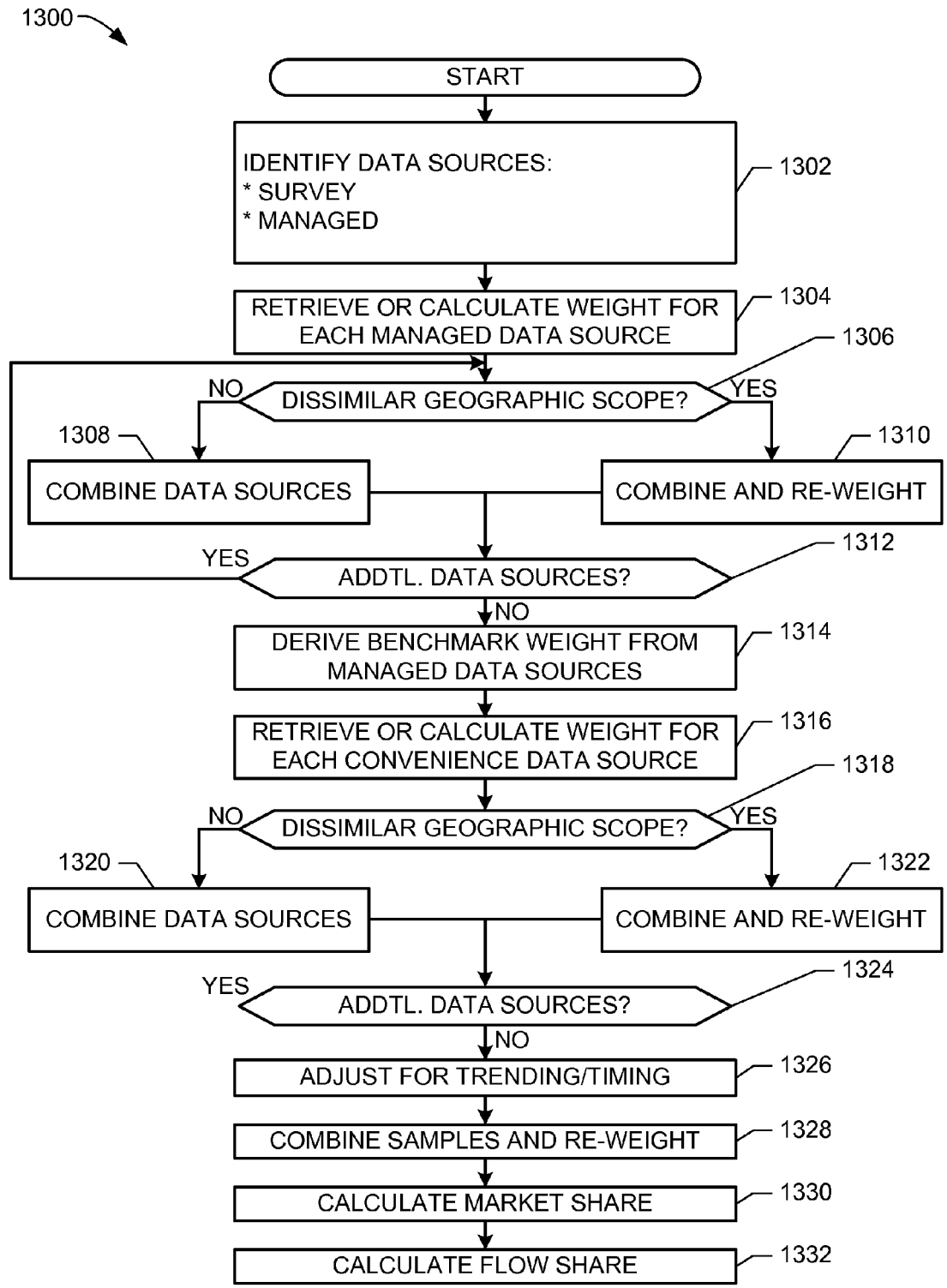

FIG. 13 illustrates an example process 1300 to calculate market share and/or calculate flow share using information from multiple data sources. At least one benefit of the methods and apparatus described herein to calculate market share and/or flow share is that one or more data sources may be combined that, standing alone, would otherwise fail to allow for such calculations having accepted accuracy standards. In the illustrated example of FIG. 13, the example data source locator 218 identifies two or more candidate data sources to reach a threshold number of samples (block 1302). The threshold number of samples may differ based on the target geography for which projections are to be made. Data sources may include, but are not limited to managed data sources and/or convenience data sources. If the example data source locator 218 does not identify any candidate managed data sources from, for example, the database information pool 1060, then a corresponding requisite (threshold) number of samples may be increased to account for potential decreases in representation confidence levels of the convenience data source(s).

Each identified managed data source includes an associated weight based on, in part, a representative geography from which the samples were derived. Additionally or alternatively, a corresponding weight may be calculated for each identified data source. For example, a managed data source, such as the Nielsen® PeopleMeter® operated and managed by The Nielsen Company® collects samples on a national level and has a geographic weight associated with its sample diversity. However, other data sources having a derived group of samples from a localized geography (e.g., regional, DMA-level, city, township, etc.) include a corresponding weight that differs from the national level. As a result, merely combining the two example data sources without adjustments to their corresponding weights would not satisfy statistical standards that comply with, for example, the ICSP. The example data source weight calculator 220 retrieves and/or calculates the corresponding weight for each managed data source (block 1304) and determines whether each data source was derived from a dissimilar geographic scope (block 1306). If not, then the data sources may be combined by the example data source combiner 222 without re-weighting the combined samples (block 1308), otherwise the example data source combiner 222 combines samples from each data source and the data source weight calculator 220 re-calculates the combined samples to yield a combined weighting value and/or normalized weighting value (block 1310). If there are additional candidate data sources to combine (block 1312), control returns to block 1306.

To provide projections in a manner that is meaningful to a client, such as a provider of Internet services or a provider of video media, the example data source weight calculator 220 derives a benchmark weight based on the managed data source(s) for each client and their corresponding geographic area (block 1314). For example, while a national managed data source includes information related to video service providers across the nation, such data may not be representative of a specific geography in which the video provider has a presence (e.g., San Francisco). As such, deriving and/or calculating the benchmark weight based on a scope of the managed data source(s) allows the service provider(s) to calibrate projections in a manner more consistent with the limited geography and/or demographics in which they operate.

The example data source weight calculator 220 also retrieves and/or calculates a weight for each convenience data source (block 1316) and determines whether the identified data source(s) have a dissimilar geographic scope (block 1318). If not, then the example data source combiner 222 combines the data sources (block 1320), otherwise the data sources are combined and re-weighted by the data source weight calculator 220 to maintain statistical integrity for later calculations and/or projections (block 1322). If there are additional convenience data sources to combine (block 1324), control returns to block 1318, otherwise the convenience data sources are adjusted and/or calibrated for timing differences with respect to the managed data sources (block 1326). Timing difference may occur in the event that the convenience data source data temporally lags behind data obtained by the managed data sources. Such timing lags may occur when the convenience data sources are acquired after a relatively longer period of time, such as a week or two weeks in the case of diary data sources. All of the managed data sources and the convenience data sources are combined and re-weighted in the aggregate (block 1328) before calculating market share (block 1330) and/or calculating flow share in a manner that is bounded by the market share calculation(s) (block 1332).

Figure 14:
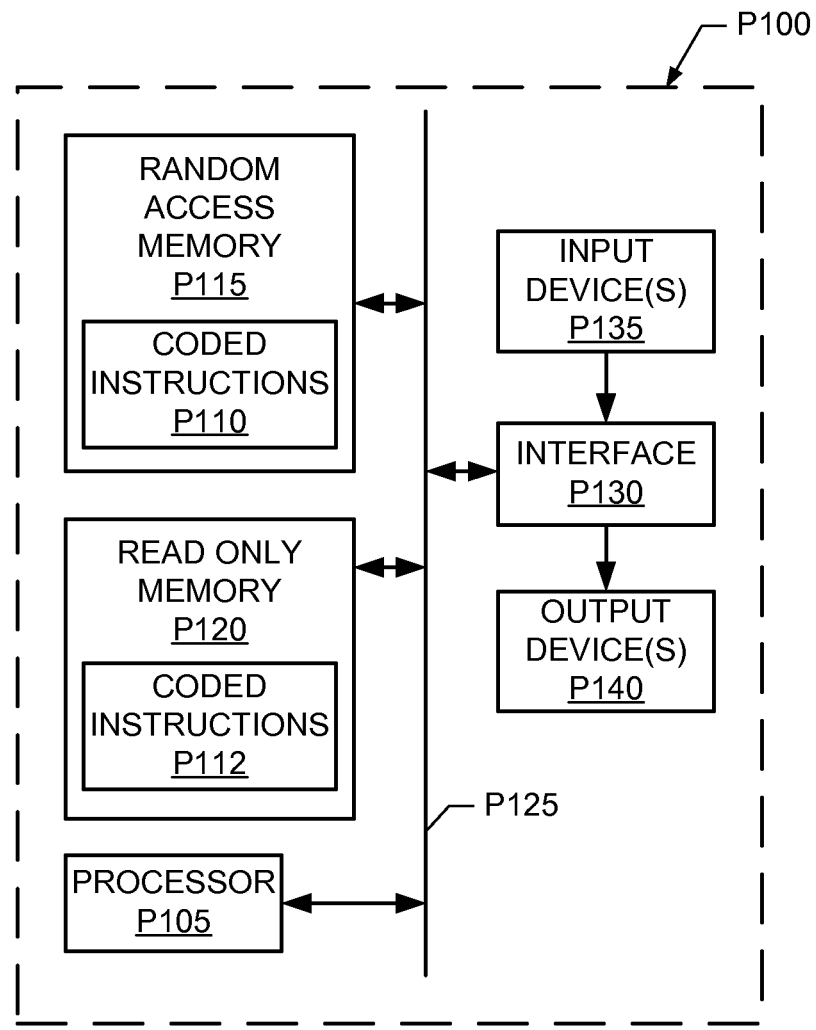
FIG. 14 is a block diagram of an example processor system that may be used to execute the example processes of FIGS. 3-8 and 11-13 to implement the example systems, apparatus, and/or methods described herein.

FIG. 14 is a schematic diagram of an example processor platform P100 that may be used and/or programmed to implement any or all of the example market share evaluator 102, the example test manager 202, the example IP address aggregator 204, the example ping manager 206, the example port scan manager 208, the example registry manager 210, the example hostname resolver 212, the example network interface 214, and/or the example panelist updater 216 of FIGS. 1, 2, and 10. For example, the processor platform P100 can be implemented by one or more general-purpose processors, processor cores, microcontrollers, etc.

The processor platform P100 of the example of FIG. 14 includes at least one general-purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example processes of FIGS. 3-8 and 11-13 to implement the example methods and apparatus described herein.

The processor P105 is in communication with the main memory (including a ROM P120 and/or the RAM P115) via a bus P125. The RAM P115 may be implemented by dynamic random access memory (DRAM), synchronous dynamic random access memory (SDRAM), and/or any other type of RAM device, and ROM may be implemented by flash memory and/or any other desired type of memory device. Access to the memory P115 and the memory P120 may be controlled by a memory controller (not shown). The example memory P115 may be used to implement the example market information database 106 of FIGS. 1 and 10.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A computer implemented method to calculate flow share of a service provider, comprising:
    identifying, with a programmed processor, a household identification number associated with an IP address retrieved from a convenience data source;
    retrieving, with the programmed processor, household data from the convenience data source that is associated with the household identification number, the convenience data source including a service provider name;
    invoking, with the programmed processor, a reverse resolve network command using the IP address retrieved from the household data to extract labels from a hostname, the labels indicative of the service provider name;
    when a threshold number of labels match a plurality of resolution keywords stored in a database, confirming a current service provider name as associated with the household identification number;
    identifying a nomenclature match by comparing, with the programmed processor, the service provider name provided by the convenience data source with the current service provider name;
    adjusting, with the programmed processor, a weight value of the retrieved household data in response to the comparison, the weight value decreased when the service provider name provided by the convenience data source is different than the current service provider name, and the weight value increased when a match occurs between the service provider name and the current service provider name; and
    calculating, with the programmed processor, service provider flow share based on the adjusted weight value and a service penetration value from a managed data source.

2. A method as defined in claim 1, further including retrieving at least one of dial-up service penetration, broadband service penetration, video service penetration, or fiber-based service penetration information from a managed data source.

3. A method as defined in claim 1, further including identifying a household service provider change by comparing the service provider name at a first time with the service provider name associated with the household identification number at a second time.

4. A method as defined in claim 1, further including identifying the service provider name by initiating a ping command to the retrieved IP address to identify an active status of the IP address.

5. A method as defined in claim 4, further including initiating a port scan when the ping command is unsuccessful, the port scan to identify the active status of the IP address.

6. A method as defined in claim 1, further including identifying the service provider name by querying a registry database with the retrieved IP address to obtain the service provider name.

7. A method as defined in claim 1, wherein calculating service provider flow share further includes retrieving indications of IP address status from the convenience data source.

8. A method as defined in claim 7, wherein the indications of IP address status includes at least one of a new subscriber ISP, an unchanged ISP with a new address, or an alternate service type.

9. A method as defined in claim 7, further including retrieving survey response data from the convenience data source.

10. A method as defined in claim 9, wherein the survey response data includes at least one of a prior Internet service provider name, a subscriber move date, or a service type.

11. An apparatus to calculate service provider flow share, comprising:
    a registry manager to retrieve a service penetration value from a managed data source;
    a data source locator to identify a convenience data source associated with a household identification number and obtain an Internet protocol (IP) address associated with the household identification number, the convenience data source including a service provider name;
    a network interface to retrieve data from the convenience data source associated with the household identification number;
    a hostname resolver to invoke a reverse resolve network command using the IP address to extract labels from a hostname the labels indicative of the service provider name, and to confirm a current service provider name as associated with the household identification number when a threshold number of labels match a plurality of resolution keywords;
    a data source weight calculator to compare the service provider name provided by the convenience data source with the current service provider name, and adjusting, by decreasing a weight value of the retrieved data from the convenience data source in response to the comparison, the weight value decreased when the service provider name retrieved from the convenience data source is different than the current service provider name, and increasing the weight value when a match occurs between the service provider name and the current service provider name; and
    a test manager to calculate service provider flow share based on the adjusted weight value from the convenience data source and a calculated market share based on the service penetration value, the registry manager, the data source locator, the network interface, the data source combiner, the data source weight calculator, or the test manager comprising a logic circuit.

12. An apparatus as defined in claim 11, wherein the convenience data source further includes at least one of a survey pool or diary data.

13. An apparatus as defined in claim 11, further including a ping manager invoked by the data source combiner to initiate a ping command to the IP address associated with the household identification number to verify an active status of the IP address.

14. An apparatus as defined in claim 13, further including a port scan manager invoked by the ping manager when the ping command is unsuccessful, the port scan manager to initiate a port scan to identify the activity status.

15. A tangible machine readable hardware storage device or storage disk comprising instructions that, when executed, cause a machine to, at least:
    identify a household identification number associated with an IP address retrieved from a convenience data source;

retrieve household data from the convenience data source that is associated with the household identification number, the convenience data source including a service provider name;

invoke a reverse resolve network command using the IP address retrieved from the household data to extract labels from a hostname, the labels indicative of the service provider name, and when a threshold number of labels match a plurality of resolution keywords stored in a database, confirm a current service provider name as associated with the household identification number;

compare a service provider name provided by the convenience data source with the current service provider name to identify a nomenclature match;

adjust a weight value of the retrieved household data in response to the comparison, the weight value decreased when the service provider name provided by the convenience data source is different than the current service provider name, and the weight value increased when a match occurs between the service provider name and the current service provider name; and calculate service provider flow share based on the adjusted weight value and a service penetration value from a managed data source.

16. A tangible machine readable hardware storage device or storage disk as defined in claim 15, wherein the instructions, when executed, further cause the machine to retrieve at least one of dial-up service penetration, broadband service penetration, video service penetration, or fiber-based service penetration information from the managed data source.

17. A tangible machine readable hardware storage device or storage disk as defined in claim 15, wherein the instructions, when executed, further cause the machine to identify a household service provider change by comparing the service provider name at a first time with the service provider name associated with the household identification number at a second time.

18. A tangible machine readable hardware storage device or storage disk as defined in claim 15, wherein the instructions, when executed, further cause the machine to identify the service provider name by querying a registry database with the retrieved IP address to obtain the service provider name.

* * * * *